(12) United States Patent
Stupack

(10) Patent No.: US 10,460,412 B1
(45) Date of Patent: Oct. 29, 2019

(54) AUTHENTICATION OF NORMAN ROCKWELL PAINTINGS

(71) Applicant: Robert Louis Stupack, Novato, CA (US)

(72) Inventor: Robert Louis Stupack, Novato, CA (US)

( * ) Notice: Subject to any disclaimer, the term of this patent is extended or adjusted under 35 U.S.C. 154(b) by 0 days.

(21) Appl. No.: 16/389,270

(22) Filed: Apr. 19, 2019

Related U.S. Application Data

(63) Continuation-in-part of application No. 16/051,773, filed on Aug. 1, 2018, which is a continuation-in-part of application No. 15/863,953, filed on Jan. 7, 2018, now abandoned.

(51) Int. Cl.
| | |
|---|---|
| *G06T 1/00* | (2006.01) |
| *G06Q 30/00* | (2012.01) |
| *B42D 25/309* | (2014.01) |
| *B42D 25/378* | (2014.01) |
| *G06K 9/00* | (2006.01) |

(52) U.S. Cl.
CPC .......... *G06T 1/0028* (2013.01); *B42D 25/309* (2014.10); *B42D 25/378* (2014.10); *G06K 9/00161* (2013.01); *G06Q 30/0185* (2013.01); *H04N 2201/327* (2013.01)

(58) Field of Classification Search
CPC .... B42D 25/30; B42D 25/333; B42D 25/378; B42D 25/382; B42D 25/309; G06K 9/00154; G06K 9/00161; G06K 19/06103; G06K 19/0614; G06T 1/0028; G06Q 30/0185; G06Q 30/0225
See application file for complete search history.

(56) References Cited

U.S. PATENT DOCUMENTS

| | | |
|---|---|---|
| 6,628,824 B1 | 9/2003 | Belanger |
| 6,993,149 B2 | 1/2006 | Brunk et al. |
| 8,653,445 B2 | 2/2014 | Pawlik et al. |
| (Continued) | | |

OTHER PUBLICATIONS

Hussein, Qasim Mohammaed; 'The Efficiency of Color Model Layers and Color Images as Cover in Text Hiding', Pure Science 21 (1) 2016.

(Continued)

*Primary Examiner* — John Villecco
(74) *Attorney, Agent, or Firm* — MP Patents, LLC

(57) ABSTRACT

A process for authenticating a painting includes determining whether a posterized HSV model of a digital photograph contains one or more steganographic symbols. A process for preparing a painting for authentication, includes providing a digital photograph of the painting in the RGB color model, converting the digital photograph to a CMYK color model, converting the CMYK model of the digital photograph to an HSV color model of the digital photograph and posterizing the HSV model of the digital photograph. A system for preparing a painting for authentication includes a processor and a computer-readable memory component containing a digital photograph of the painting in the RGB color model. The processor is configured to convert the digital photograph to a CMYK color model, convert the CMYK model of the digital photograph to an HSV color model of the digital photograph and posterize the HSV model of the digital photograph.

11 Claims, 46 Drawing Sheets
(40 of 46 Drawing Sheet(s) Filed in Color)

(56) References Cited

U.S. PATENT DOCUMENTS

| | | |
|---|---|---|
| 8,867,782 B2 | 10/2014 | Kurtz et al. |
| 8,941,886 B2 | 1/2015 | Kurtz et al. |
| 8,947,744 B2 | 2/2015 | Kurtz et al. |
| 9,667,829 B2 | 5/2017 | Bai et al. |
| 9,710,871 B2 | 7/2017 | Lyons et al. |
| 9,805,435 B2 | 10/2017 | Reed et al. |
| 2002/0021824 A1 | 2/2002 | Reed et al. |
| 2002/0067844 A1 | 6/2002 | Reed et al. |
| 2002/0164051 A1 | 11/2002 | Reed et al. |
| 2002/0164052 A1 | 11/2002 | Reed et al. |
| 2002/0168085 A1 | 11/2002 | Reed et al. |
| 2013/0335783 A1 | 12/2013 | Kurtz et al. |
| 2013/0335784 A1 | 12/2013 | Kurtz et al. |
| 2013/0336525 A1 | 12/2013 | Kurtz et al. |
| 2014/0285684 A1* | 9/2014 | Huang ............... H04N 1/00005 348/223.1 |
| 2015/0371613 A1 | 12/2015 | Patel et al. |
| 2016/0198064 A1 | 7/2016 | Bai et al. |
| 2017/0236239 A1 | 8/2017 | Reed et al. |
| 2017/0331976 A1 | 11/2017 | Bai et al. |

OTHER PUBLICATIONS

Abdullah, Ahmed; "Text Hiding Based on Hue Content in HSV Color Space"; Apr. 2015; International Journal of Emerging Trends & Technology in Computer Science; vol. 4, Iss. 2; pp. 10-173 (Year: 2015).

Shobana; "An Efficient Image Steganographica Algorithm Using CMYK Color Model"; 2015, International Journal of Research and Innovations in Science and Technology; vol. 2, Iss. 2, pp. 25-31 (Year: 2015).

* cited by examiner

AUTHENTICATION OF NORMAN ROCKWELL PAINTINGS

CROSS REFERENCE TO RELATED APPLICATIONS

This application is a continuation-in-part of U.S. Non-Provisional application Ser. No. 16/051,773 filed on 2018 Aug. 1, which is a continuation-in-part of U.S. NonProvisional application Ser. No. 15/863,953 filed on 2018 Jan. 7, abandoned, both of which are incorporated herein by reference in their entirety.

BACKGROUND

Original Norman Rockwell paintings created after 1942, contain one or more features Mr. Rockwell employed to prevent forgery. In 2006 it was discovered that an impostor of Norman Rockwell's 1954 painting, 'Breaking Home Ties' was on exhibit at the Norman Rockwell Museum. Authentication may have avoided this error.

The 1930's saw rapid technological advancements in the field of photography and the standardization of color models by the International Commission on Illumination (CIE). In 1938, Mr. Martin J. Weber, created a variety of innovative methods for photography and filed a patent application for a process called, "Posterization." Mr. Weber's invention caused two-dimensional photographs to appear as three-dimensional images that sprung off the page. Posterization, a type of color quantization, is a highly technical process which uses a fixed palette (RGB or CMYK) and then minimizes the number of colors used within the same color model. A photograph is converted into a series of three negatives, each designated for a different color. When the three negatives are printed or otherwise presented together, each slightly off-register, the final product appears to be three-dimensional.

Around 1940, Mr. Rockwell realized that some of the innovations of the 1930s might also be applicable to painted artwork and began blending Posterization and Steganography, the art of hiding data in a cover medium, to provide anti-forgery features to his paintings. Mr. Rockwell used RGB model paints to hide his initials and the syllables of his name in the CMYK paint colors he used. The human eye does not perceive the slight difference between the CMYK colors and RGB colors and any variation in shade between the two types of paint does not appear on a photograph taken with a camera since cameras operate on the RGB color model.

SUMMARY

The disclosure describes a process for authenticating an image. The process includes providing a digital photograph of the image, converting the digital photograph to a CMYK color model, adjusting saturation of the CMYK color model of the digital photograph to 60% of complete saturation, adjusting the hue of the CMYK model of the digital photograph to 57 degrees on a red-zeroed color wheel, converting the saturation-adjusted and hue-adjusted CMYK model of the digital photograph to an HSV color model of the digital photograph, in the HSV color model of the digital photograph shifting input color components having a hue of between about 46 degrees and about 66 degrees on the red-zeroed color wheel to a hue of between about 281 degrees and about 315 degrees on the red-zeroed color wheel, posterizing the hue-adjusted HSV model of the digital photograph to include three colors and determining whether the hue-adjusted HSV model of the digital photograph contains one or more steganographic symbols.

The disclosure also describes a process for preparing an image for authentication. The process includes providing a digital photograph of the image in the RGB color model, converting the digital photograph to a CMYK color model, adjusting saturation level of the CMYK color model of the digital photograph to 60% of complete saturation, adjusting hue of the CMYK model of the digital photograph to 57 degrees on a red-zeroed color wheel, converting the saturation-adjusted and hue-adjusted CMYK model of the digital photograph to an HSV color model of the digital photograph, in the HSV color model of the digital photograph shifting input color components having a hue of between about 46 degrees and about 66 degrees on the red-zeroed color wheel to a hue of between about 281 degrees and about 315 degrees on the red-zeroed color wheel and posterizing the hue-adjusted HSV model of the digital photograph to include two or three colors.

Further, the disclosure describes a process to authenticate Norman Rockwell paintings. The process includes providing a large format digital photograph of a painting or a large format digital photograph of a photograph of a painting, converting the digital photograph to a CMYK color model, adjusting global saturation level to 60% of complete saturation and cyans hue level for the CMYK color model to maximize cyan components by offsetting 57 degrees on a red-zeroed color wheel, converting the CMYK color model to HSV color model, adjusting hue level of the HSV color model to maximize magenta components by shifting input color components having a hue of between about 46 degrees and about 66 degrees on the red-zeroed color wheel to a hue of between about 281 degrees and about 315 degrees on the red-zeroed color wheel and posterizing the cyan- and magenta-maximized HSV Color Model to include three colors.

BRIEF DESCRIPTION OF THE FIGURES

The patent or application file contains at least one drawing executed in color. Copies of this patent or patent application publication with color drawing(s) will be provided by the Office upon request and payment of the necessary fee.

The summary above, as well as the following detailed description of illustrative embodiments, is better understood when read in conjunction with the appended drawings. For the purpose of illustrating the disclosure, example constructions are shown in the drawings. However, the disclosure is not limited to specific processes and instrumentalities disclosed herein. Moreover, those having ordinary skill in the art will understand that the drawings are not to scale. Wherever possible, like elements have been indicated by identical numbers.

Figure 1:
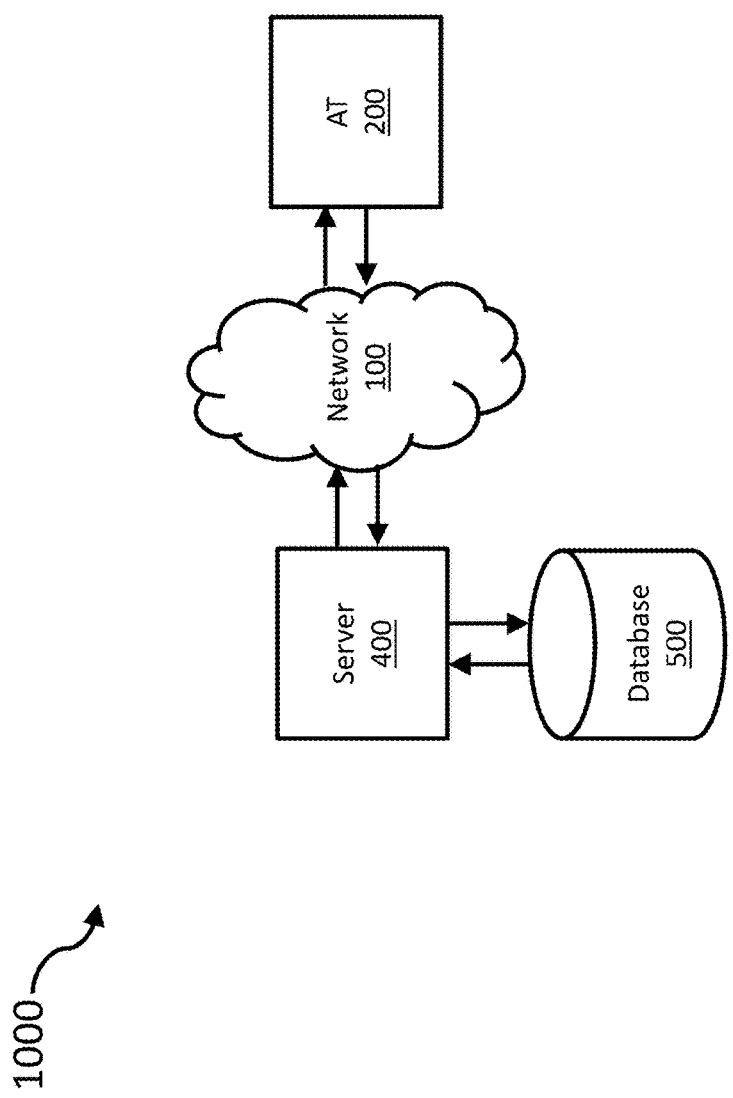

Embodiments of the disclosure will now be described, by way of example only, with reference to the following diagrams wherein:

FIG. 1 illustrates an example network environment suitable for implementing disclosed systems and processes.

Figure 2:
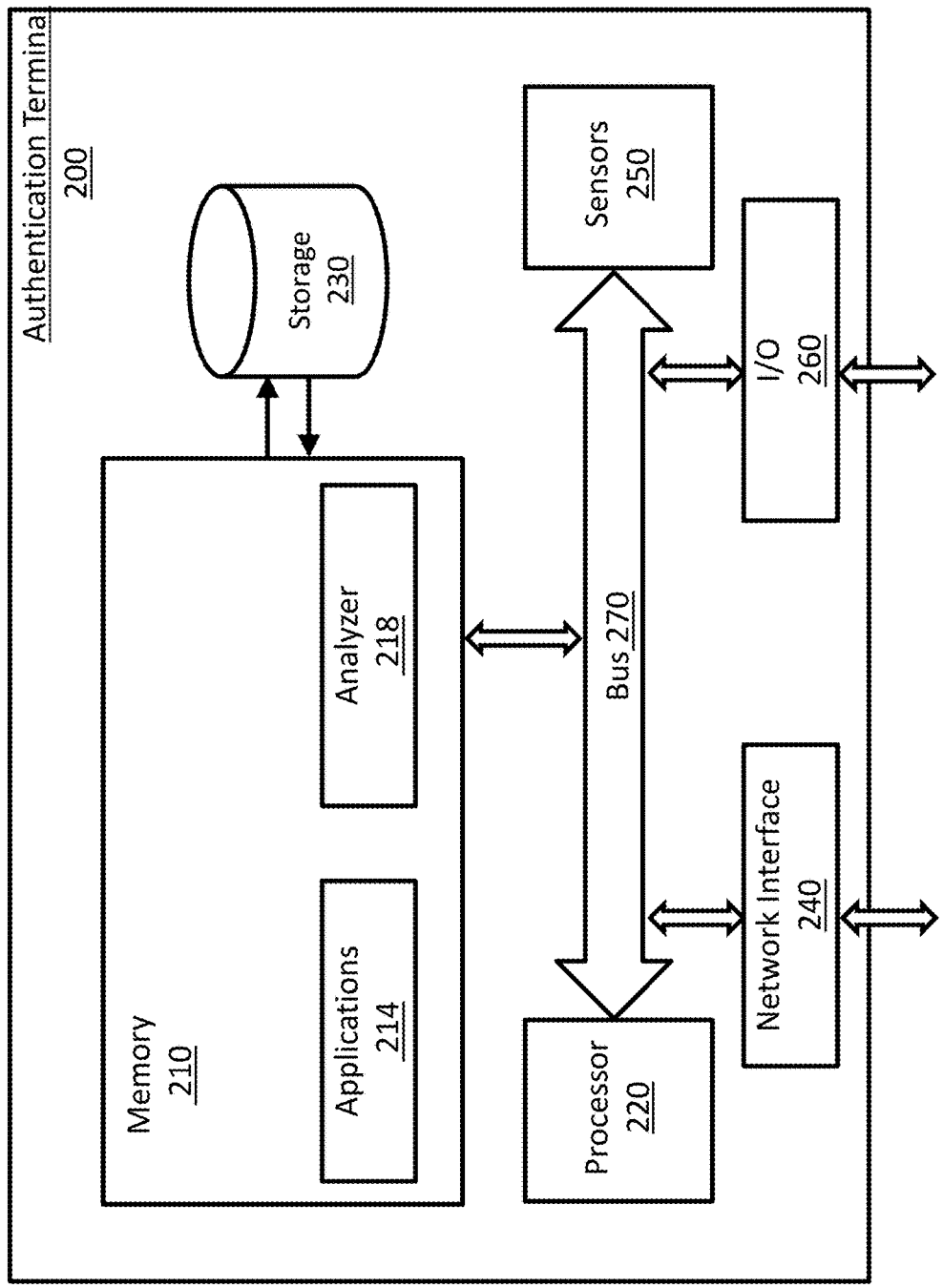

FIG. 2 illustrates various components of a data processing unit in the form of an example authentication terminal, in accordance with an embodiment of the disclosure.

Figure 3A:
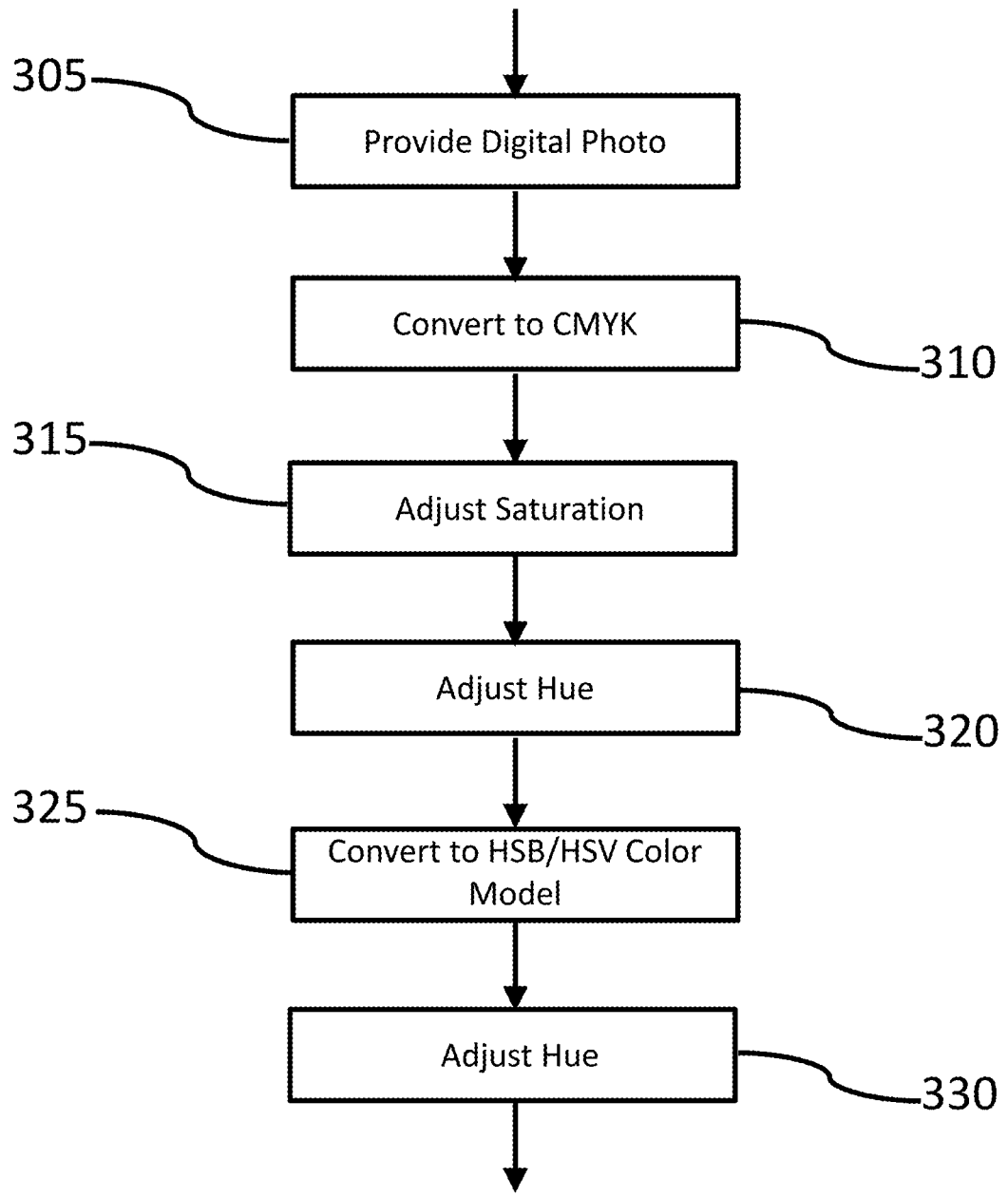
Figure 3B:
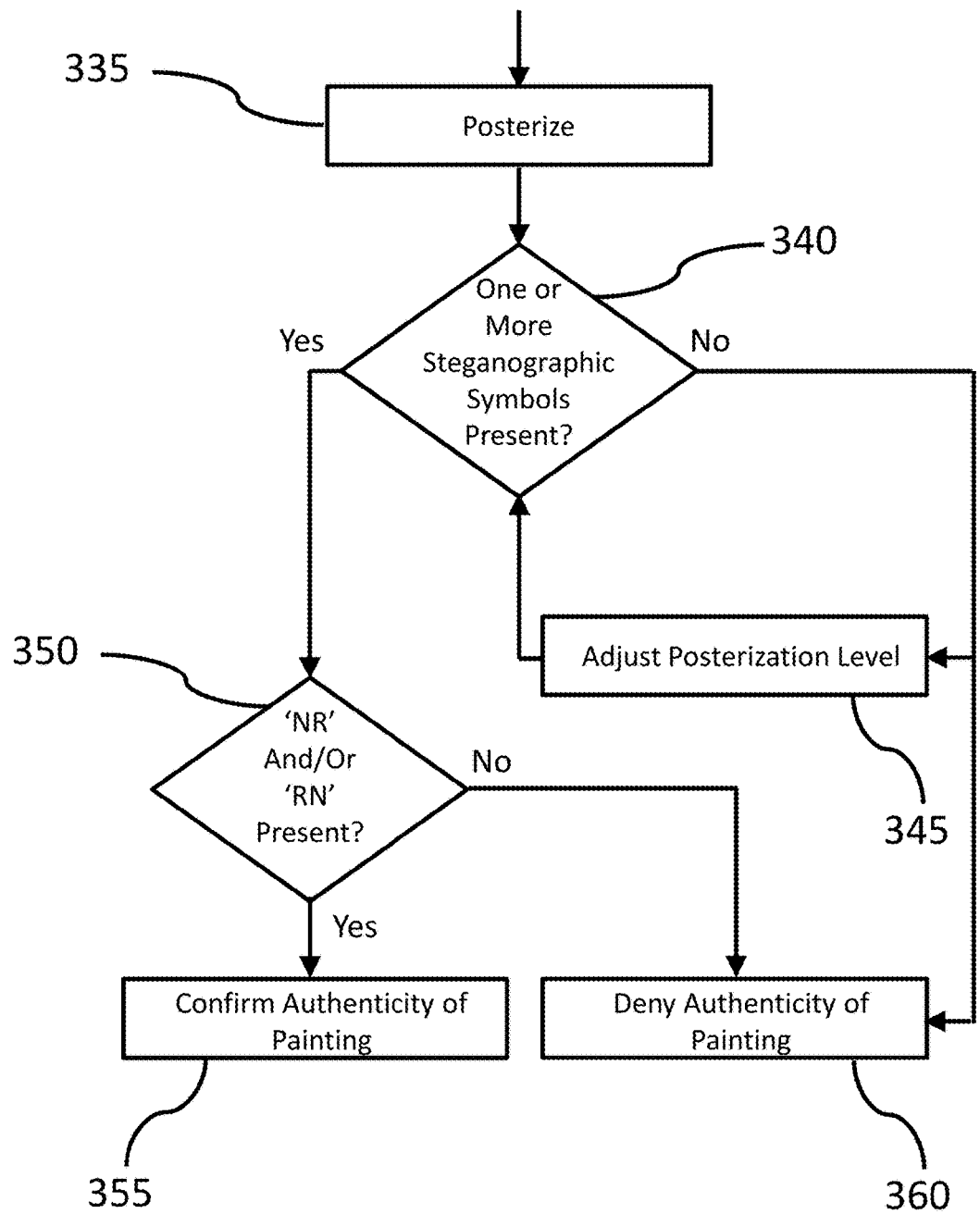

FIGS. 3A & 3B illustrate a flow of an example process for authenticating an image.

Figure 4:
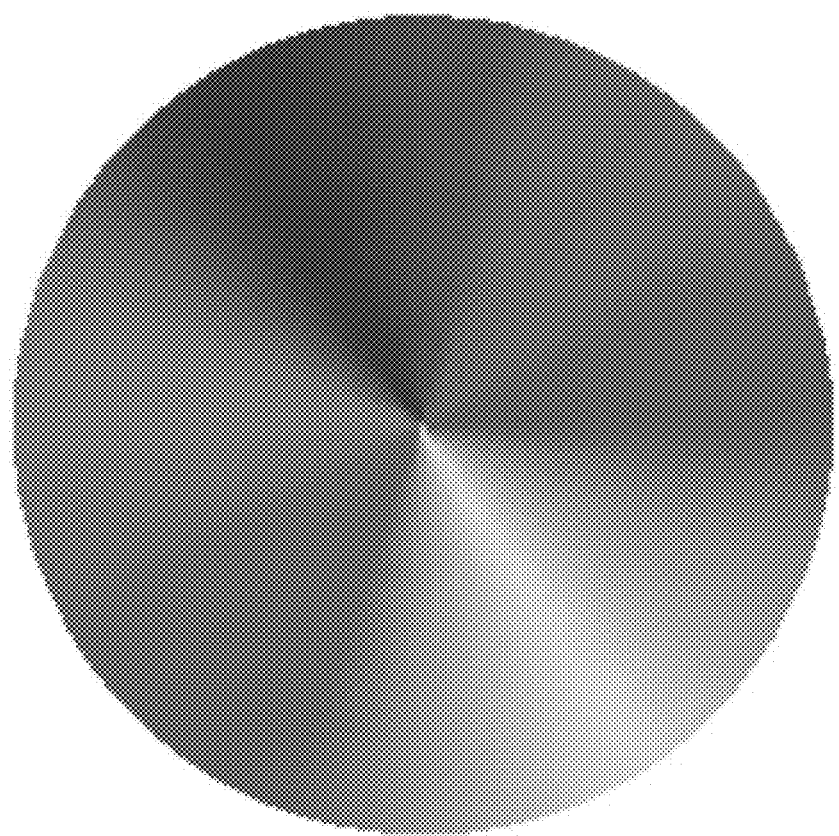

FIG. 4 illustrates a red-zeroed color wheel suitable for use with disclosed systems and methods.

Figure 5A:
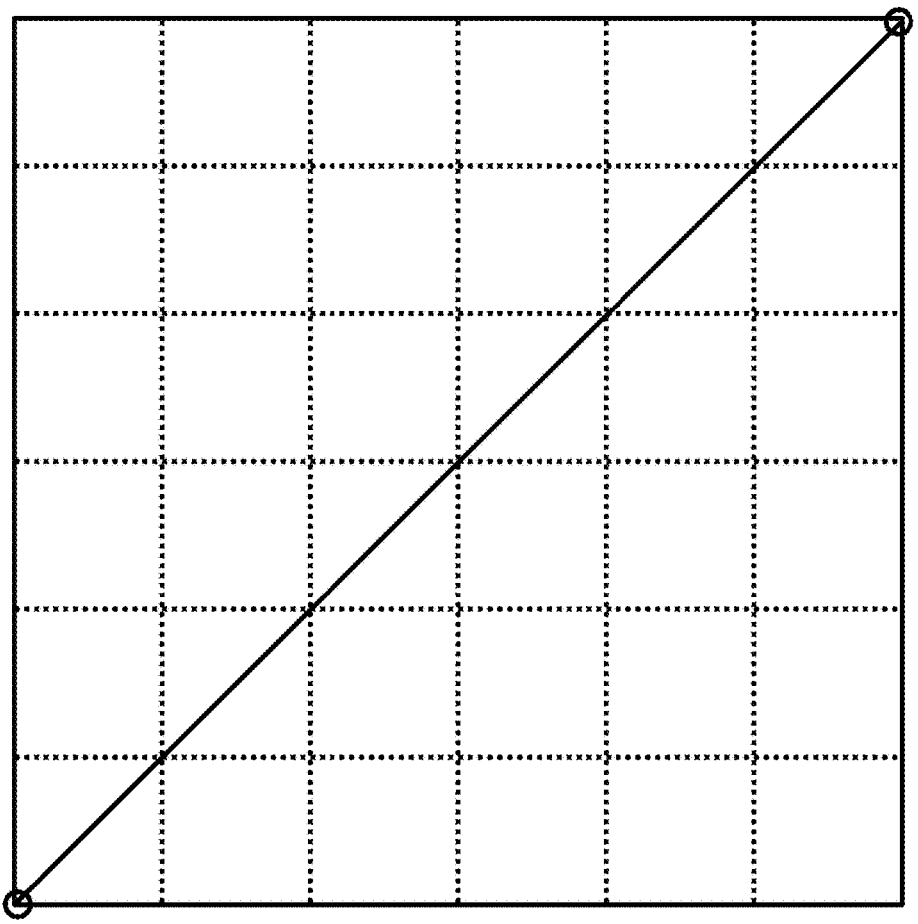

FIG. 5A illustrates a starting input/output curve suitable for hue adjustment in an HSV color model.

Figure 5B:
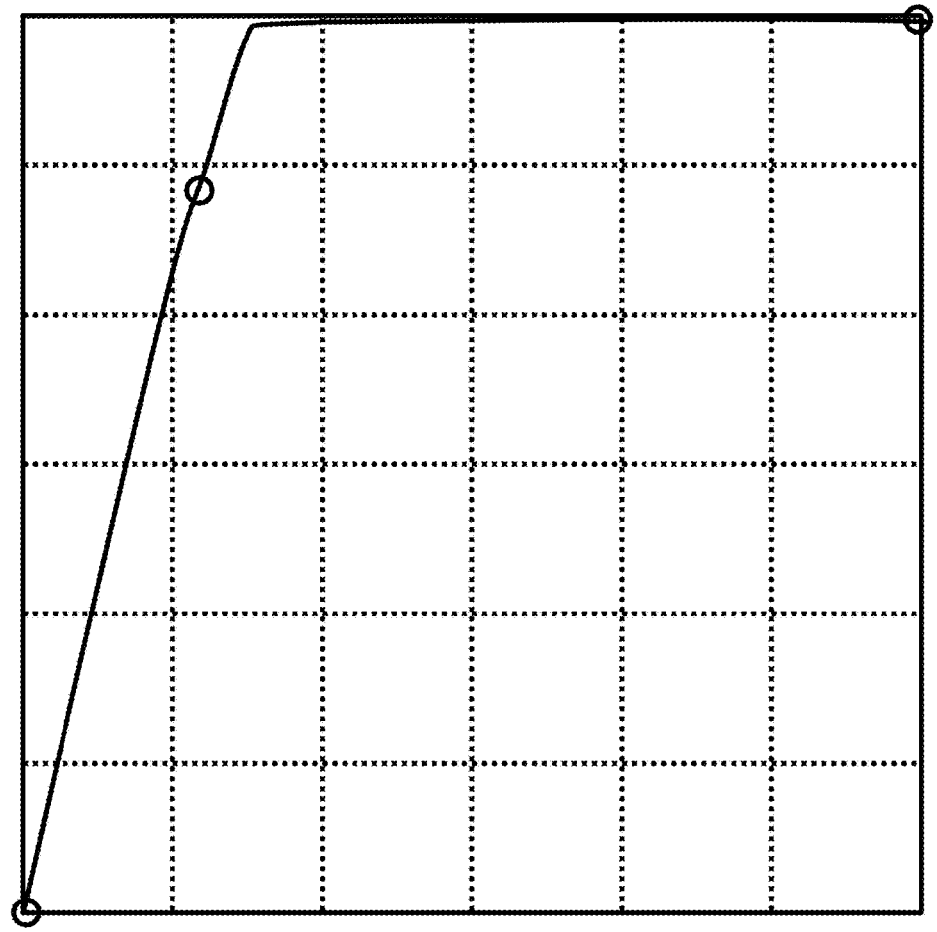

FIG. 5B illustrates the input/output curve of FIG. 4A suitably manipulated to adjust magenta hue to a level sufficient to prepare an image for authentication.

Figure 6A:

FIG. 6A is a digital photograph of an authentic painting by Norman Rockwell from November 1954 entitled 'Breaking Home Ties'.

Figure 6B:

FIG. 6B is a digital photograph of an imposter painting of 'Breaking Home Ties'.

Figure 6C:

FIG. 6C is the digital photograph of the authentic 'Breaking Home Ties' painting converted to a CMYK Color Model.

Figure 6D:

FIG. 6D is the digital photograph of the imposter painting of 'Breaking Home Ties' converted to a CMYK Color Model.

Figure 6E:

FIG. 6E is the CMYK-converted digital photograph of the authentic 'Breaking Home Ties' painting subsequently converted to an HSV Color Model.

Figure 6F:
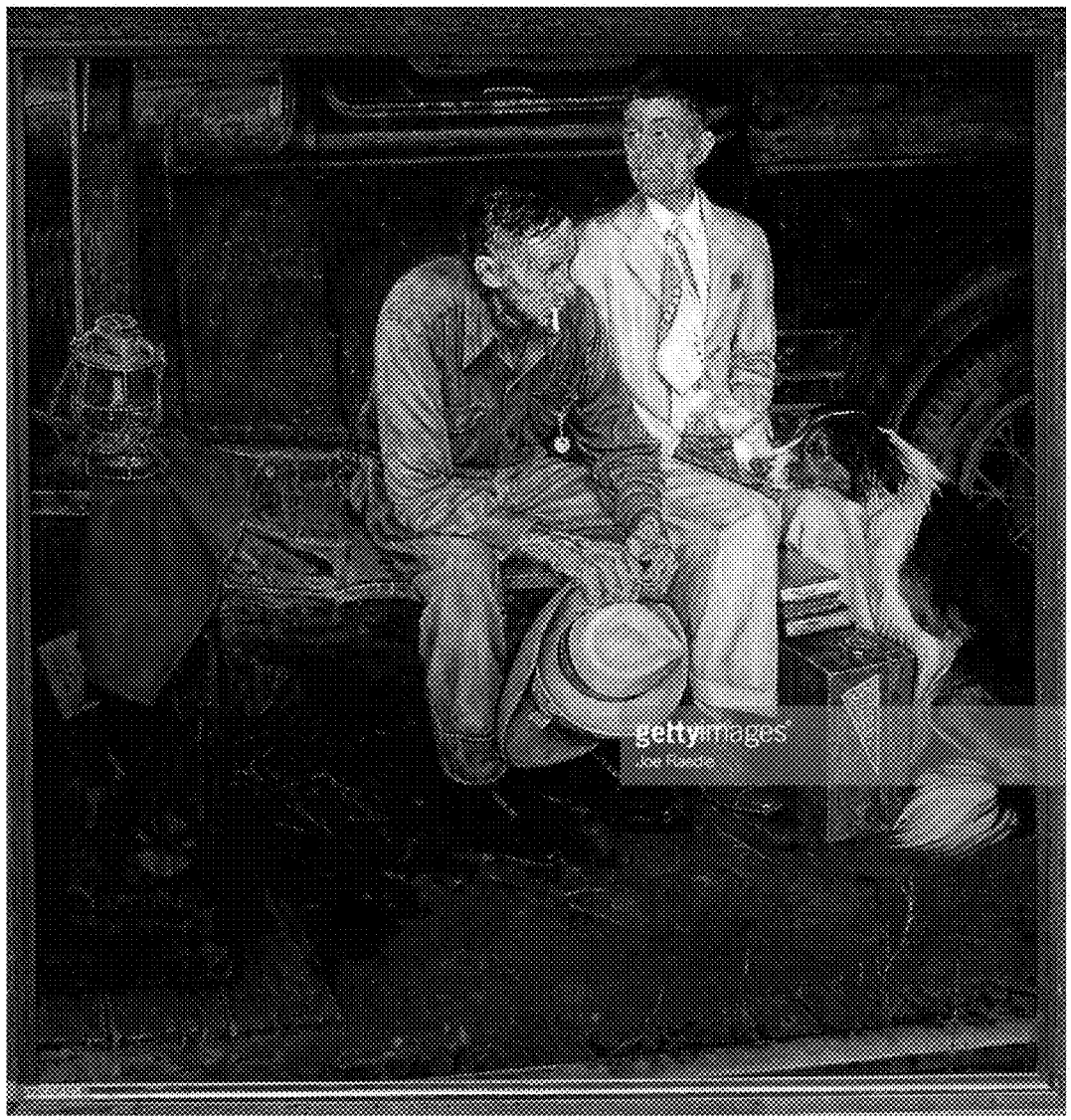

FIG. 6F is the CMYK-converted digital photograph of the imposter painting of 'Breaking Home Ties' subsequently converted to an HSV Color Model.

Figure 6G:

FIG. 6G is the HSV-converted digital photograph of the authentic 'Breaking Home Ties' painting after posterization.

Figure 6H:

FIG. 6H is the HSV-converted digital photograph of the imposter painting of 'Breaking Home Ties' painting after posterization.

Figure 6I:

FIG. 6I is the posterized, HSV-converted digital photograph of the authentic Breaking Home Ties painting with annotations.

Figure 7A:
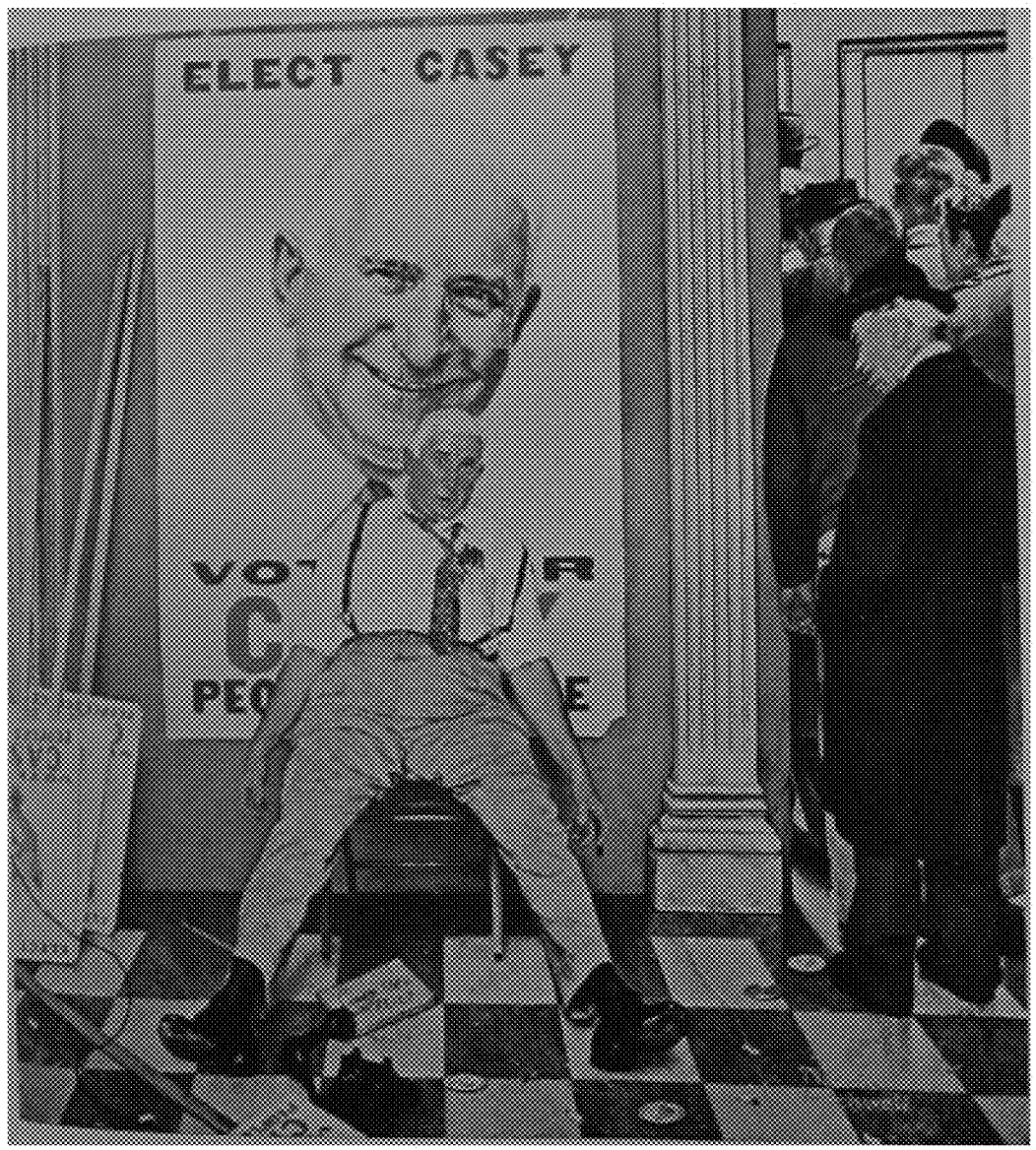

FIG. 7A is a digital photograph of an authentic painting by Norman Rockwell from November 1958 entitled 'Elect Casey'.

Figure 7B:
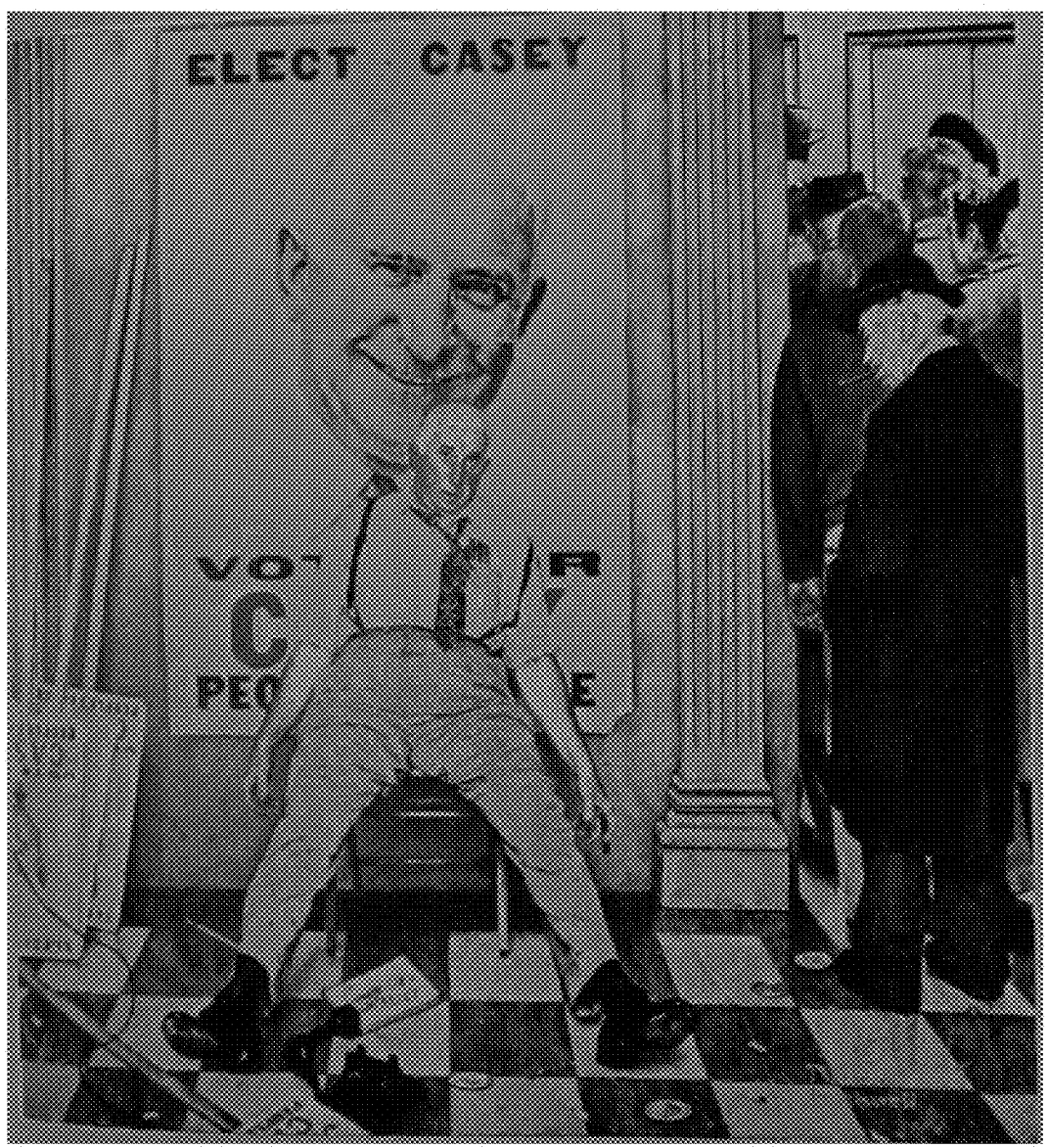

FIG. 7B is the digital photograph of the 'Elect Casey' painting converted to a CMYK Color Model.

Figure 7C:

FIG. 7C is the CMYK-converted digital photograph of the 'Elect Casey' painting subsequently converted to an HSV Color Model.

Figure 7D:
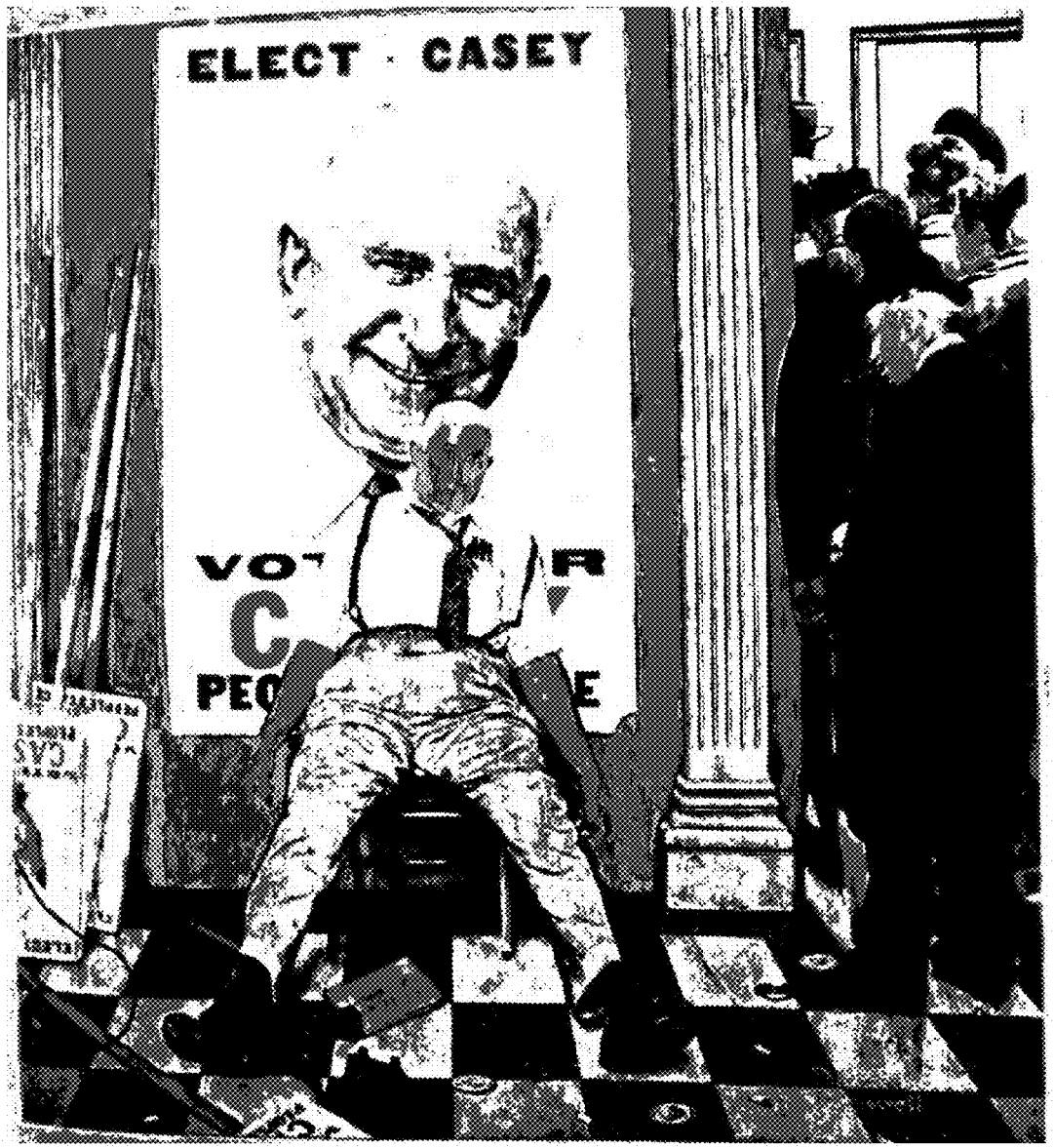

FIG. 7D is the HSV-converted digital photograph of the 'Elect Casey' painting after posterization.

Figure 7E:
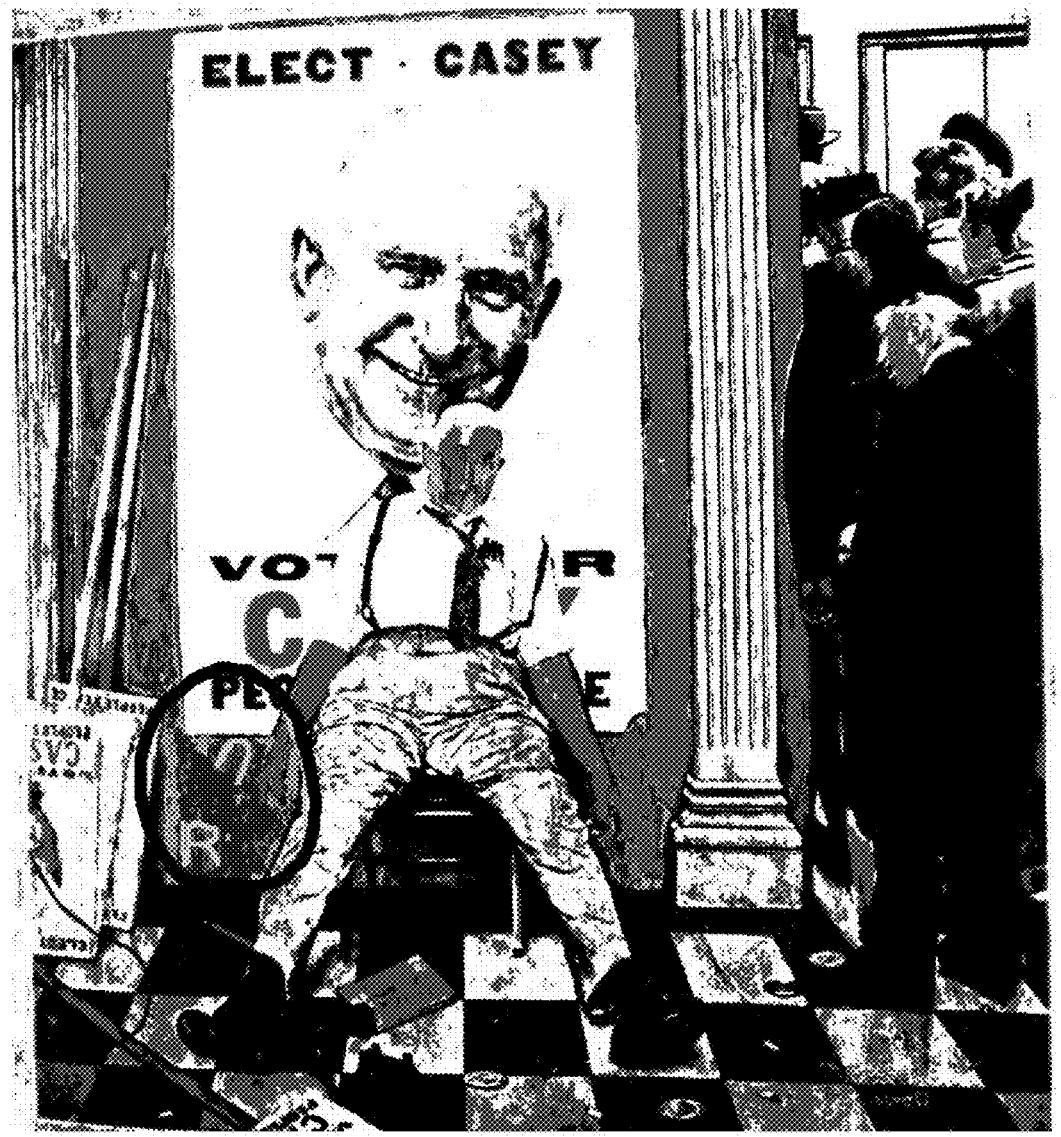

FIG. 7E is the posterized, HSV-converted digital photograph of the Elect Casey painting with annotations.

Figure 8A:

FIG. 8A is a digital photograph of an authentic painting by Norman Rockwell from April 1946 entitled 'Playbill'.

Figure 8B:

FIG. 8B is the digital photograph of the 'Playbill' painting converted to a CMYK Color Model.

Figure 8C:

FIG. 8C is the CMYK-converted digital photograph of the 'Playbill' painting subsequently converted to an HSV Color Model.

Figure 8D:
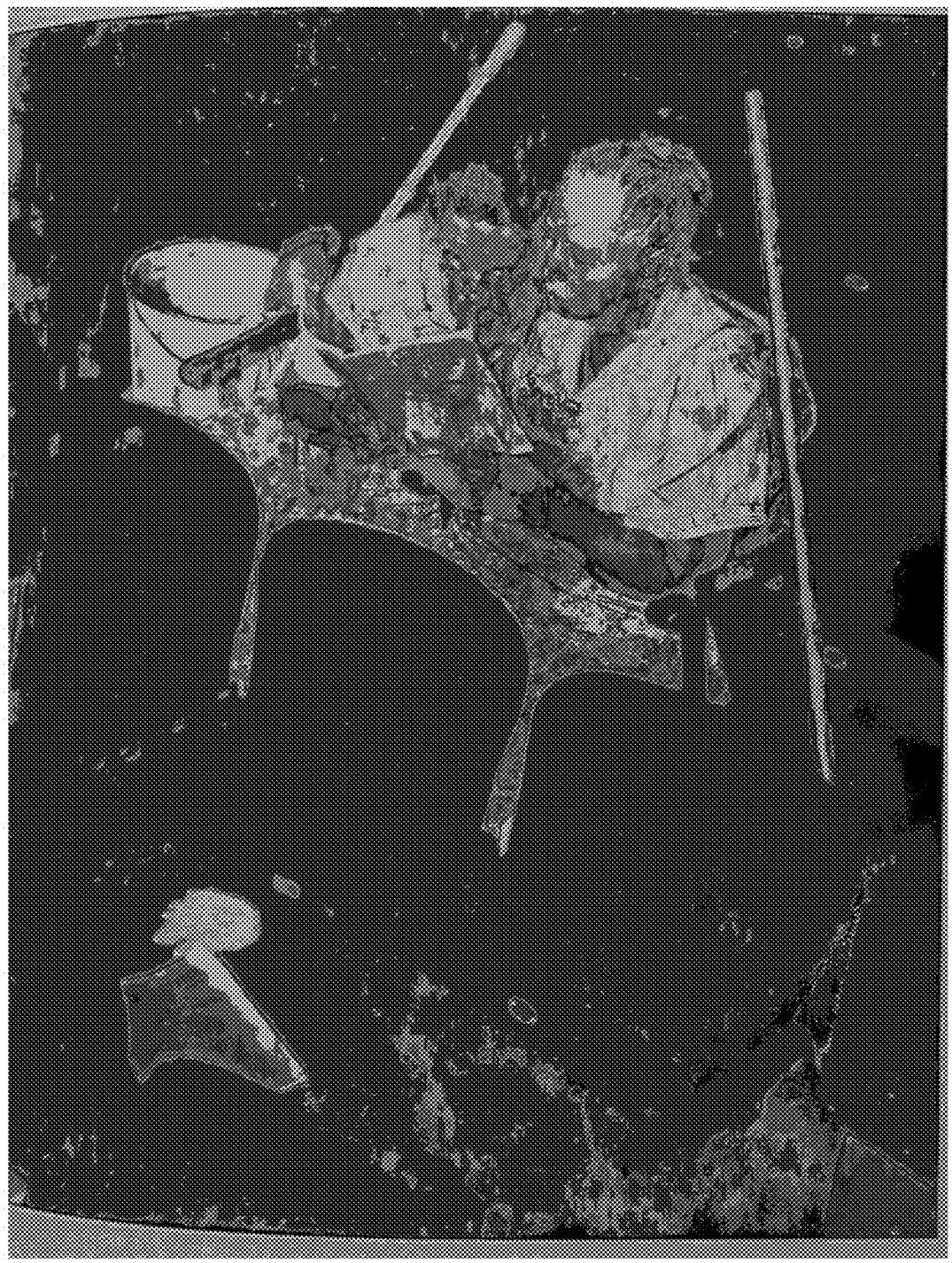

FIG. 8D is the HSV-converted digital photograph of the 'Playbill' painting after posterization.

Figure 8E:
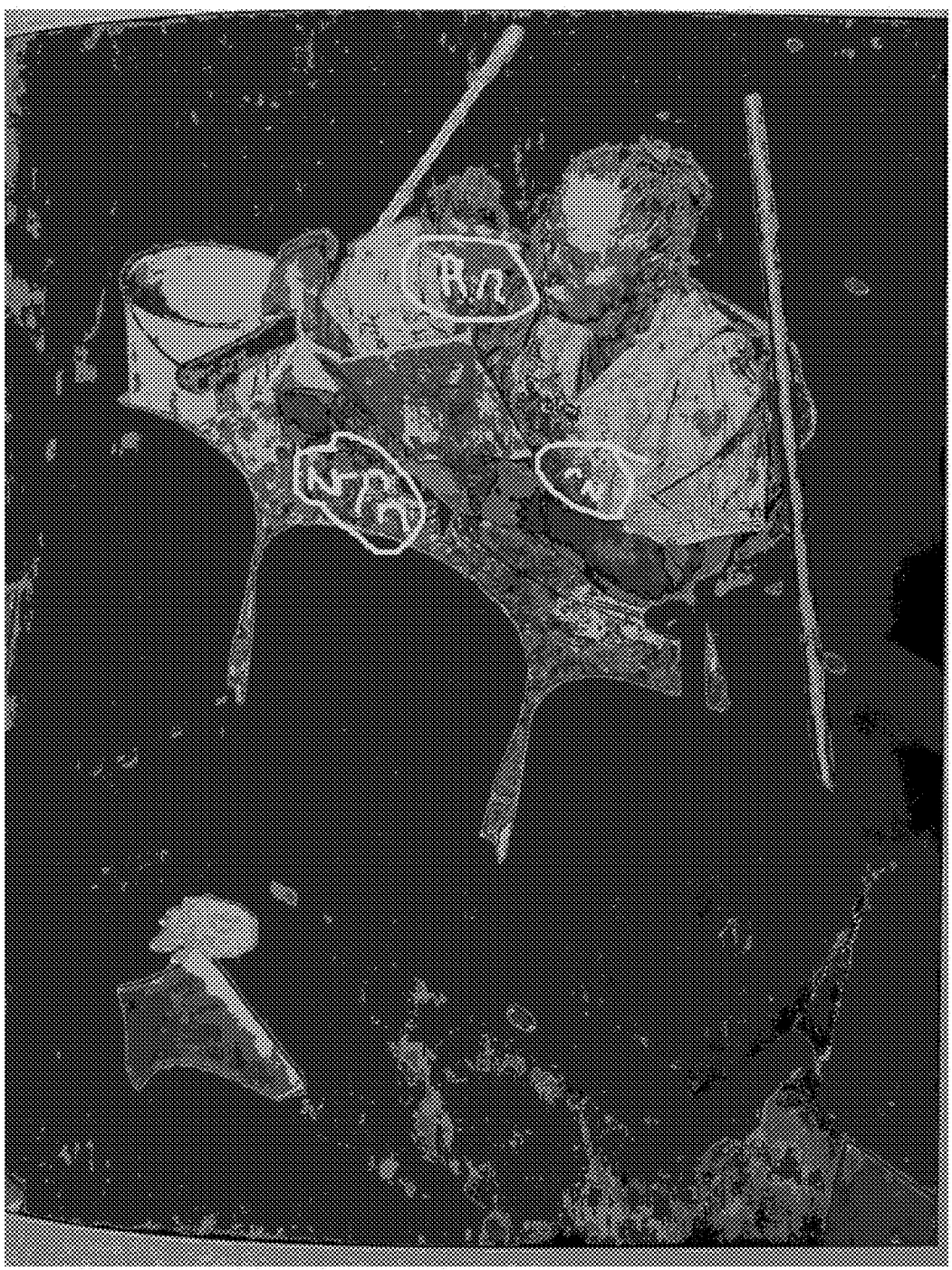

FIG. 8E is the posterized, HSV-converted digital photograph of the 'Playbill' painting with annotations.

Figure 9A:
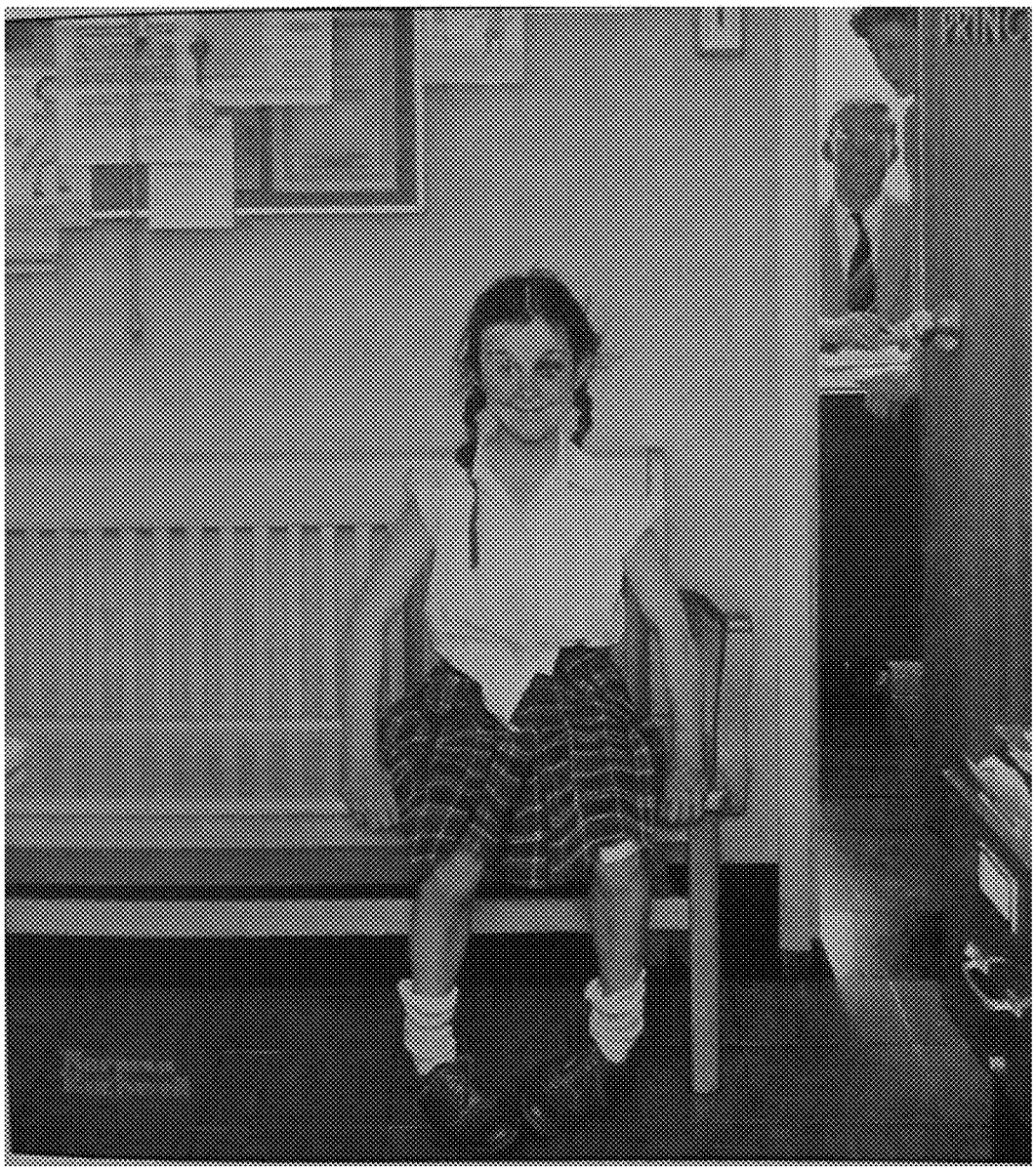

FIG. 9A is a digital photograph of an authentic painting by Norman Rockwell from 1953 entitled 'Girl with Black Eye'.

Figure 9B:

FIG. 9B is the digital photograph of the 'Girl with Black Eye' painting converted to a CMYK Color Model.

Figure 9C:

FIG. 9C is the CMYK-converted digital photograph of the 'Girl with Black Eye' painting subsequently converted to an HSV Color Model.

Figure 9D:

FIG. 9D is the HSV-converted digital photograph of the 'Girl with Black Eye' painting after posterization.

Figure 9E:

FIG. 9E is the posterized, HSV-converted digital photograph of the 'Girl with Black Eye' painting with annotations.

Figure 10A:

FIG. 10A is a digital photograph of an authentic painting by Norman Rockwell from November 1945 entitled 'Mother and Son Peeling Potatoes'.

Figure 10B:

FIG. 10B is the digital photograph of the 'Mother and Son Peeling Potatoes' painting converted to a CMYK Color Model.

Figure 10C:

FIG. 10C is the CMYK-converted digital photograph of the 'Mother and Son Peeling Potatoes' painting subsequently converted to an HSV Color Model.

Figure 10D:

FIG. 10D is the HSV-converted digital photograph of the 'Mother and Son Peeling Potatoes' painting after posterization.

Figure 10E:

FIG. 10E is the posterized, HSV-converted digital photograph of the 'Mother and Son Peeling Potatoes' painting with annotations.

Figure 11A:
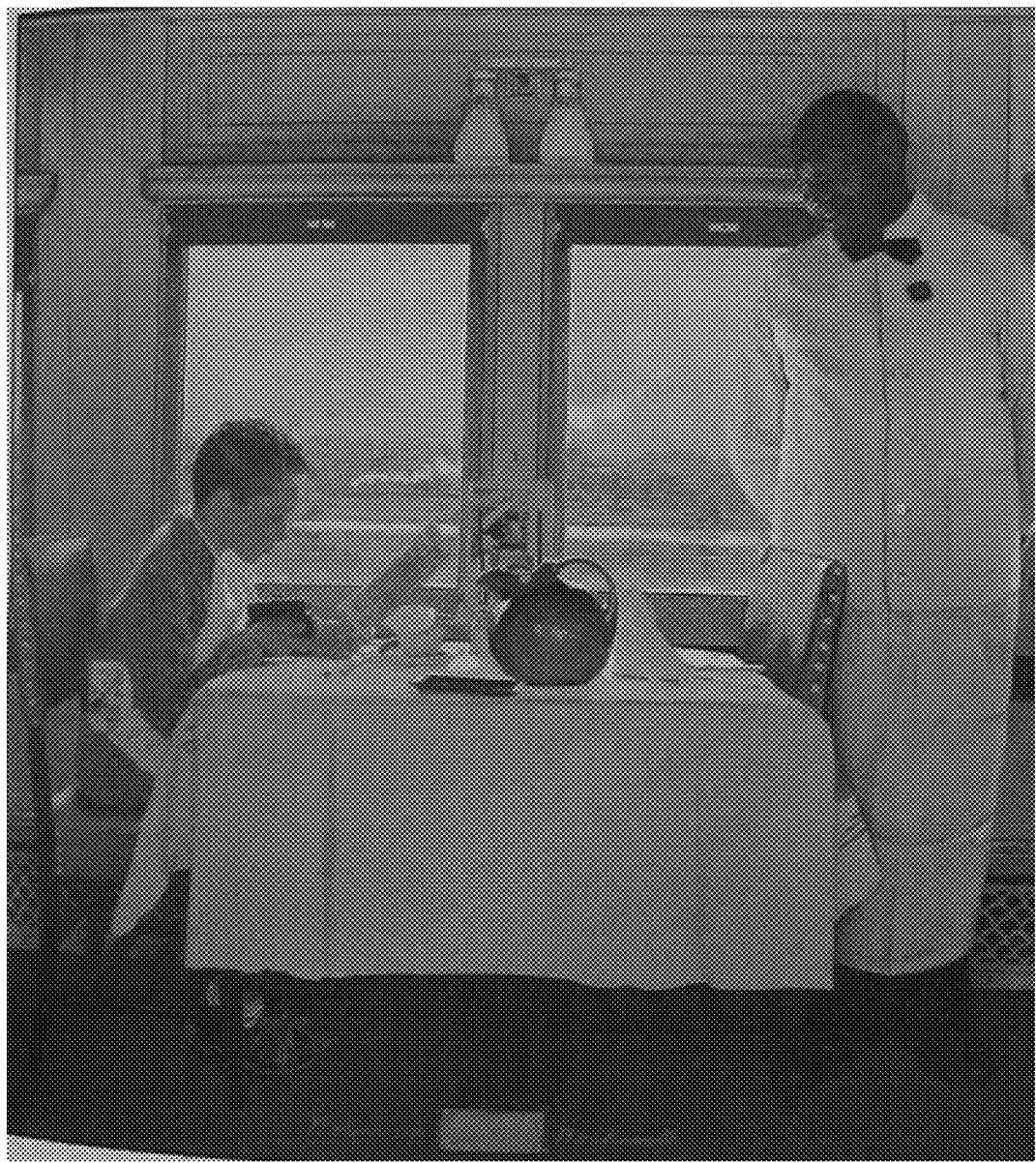

FIG. 11A is a digital photograph of an authentic painting by Norman Rockwell from December 1946 entitled 'Boy in Dining Car'.

Figure 11B:
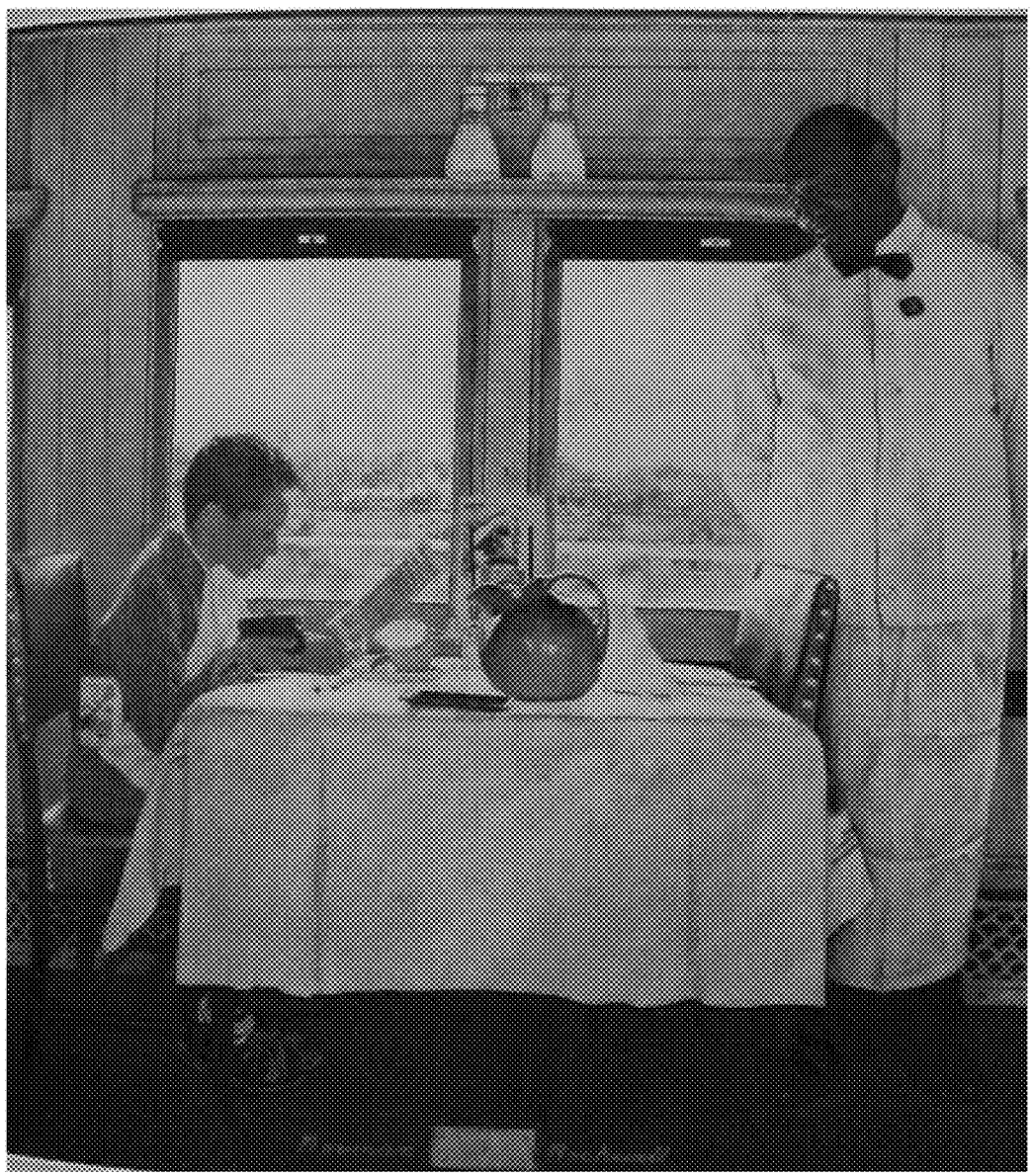

FIG. 11B is the digital photograph of the 'Boy in Dining Car' painting converted to a CMYK Color Model.

Figure 11C:

FIG. 11C is the CMYK-converted digital photograph of the 'Boy in Dining Car' painting subsequently converted to an HSV Color Model.

Figure 11D:

FIG. 11D is the HSV-converted digital photograph of the 'Boy in Dining Car' painting after posterization.

Figure 11E:

FIG. 11E is the posterized, HSV-converted digital photograph of the 'Boy in Dining Car' painting with annotations.

Figure 12A:
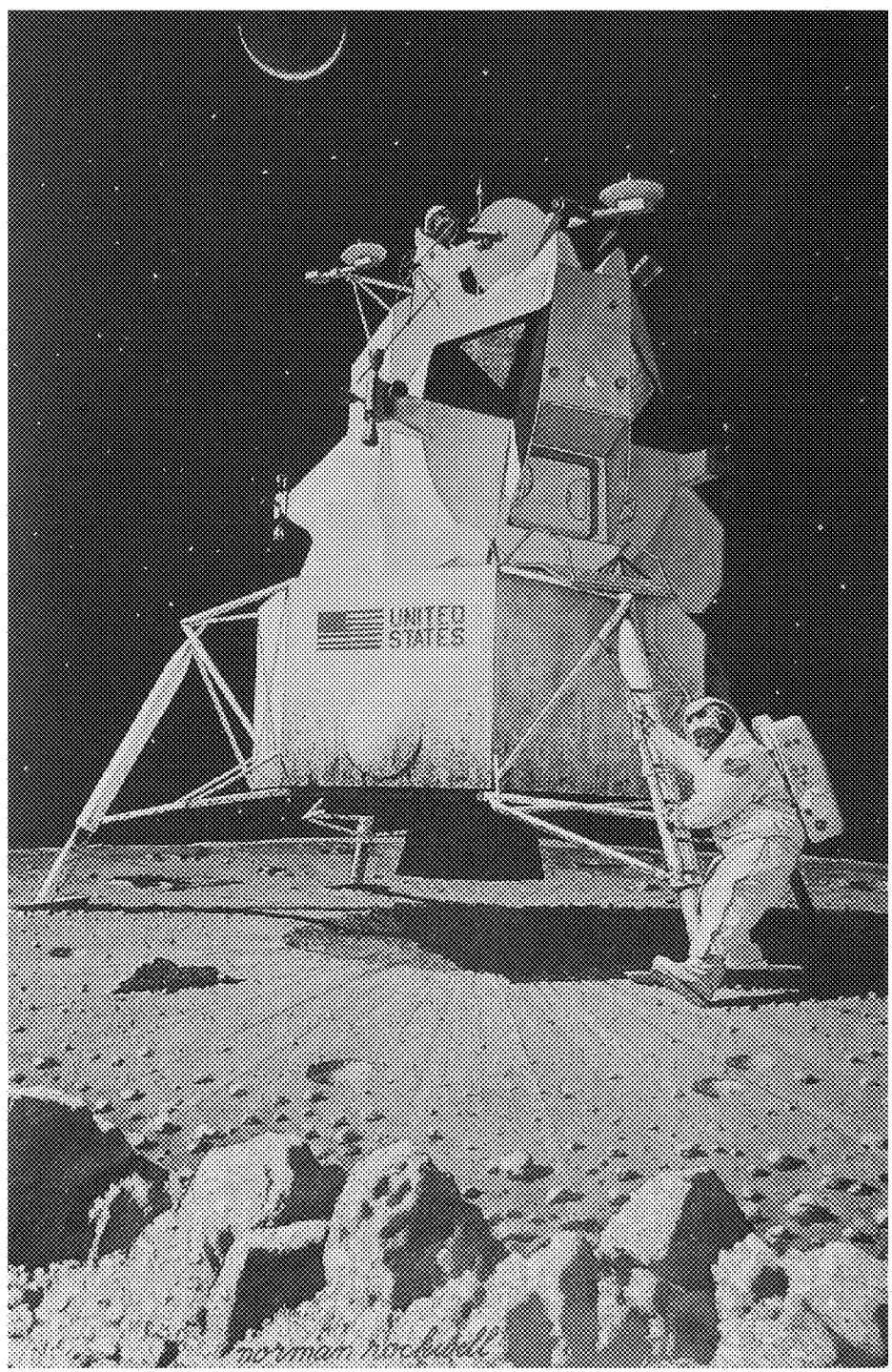

FIG. 12A is a digital photograph of an authentic painting by Norman Rockwell from December 1969 entitled 'Man's Tracks on the Moon'.

Figure 12B:
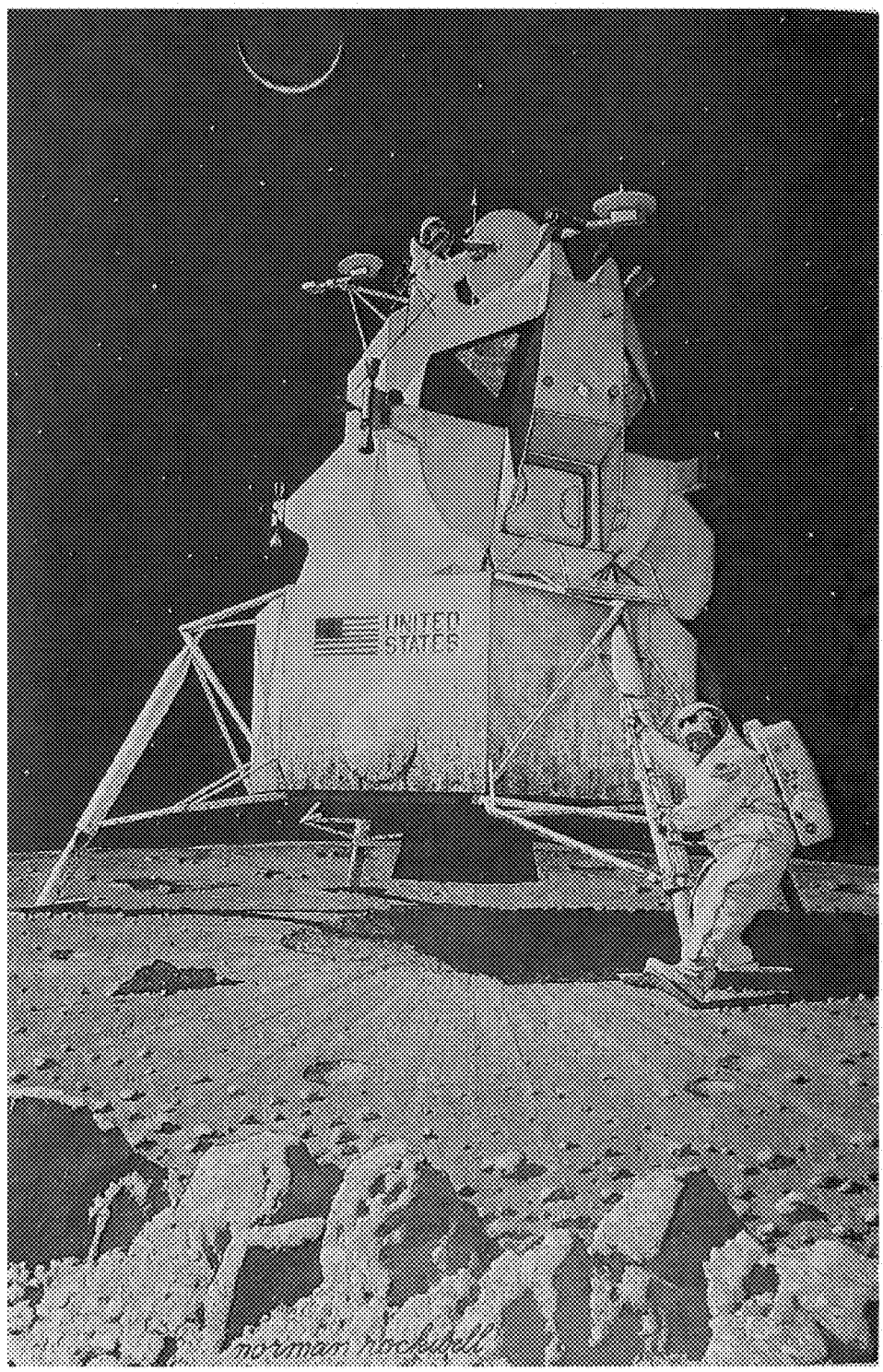

FIG. 12B is the digital photograph of the 'Man's Tracks on the Moon' painting converted to a CMYK Color Model.

Figure 12C:

FIG. 12C is the CMYK-converted digital photograph of the 'Man's Tracks on the Moon' painting subsequently converted to an HSV Color Model.

Figure 12D:

FIG. 12D is the HSV-converted digital photograph of the 'Man's Tracks on the Moon' painting after posterization.

Figure 12E:

FIG. 12E is the posterized, HSV-converted digital photograph of the 'Man's Tracks on the Moon' painting with annotations.

DETAILED DESCRIPTION

The following detailed description illustrates embodiments of the disclosure and manners by which they can be implemented. Although the best mode of carrying out the present disclosure has been described, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Mr. Rockwell's steganographic process demanded in-depth knowledge of the differences between these three-color models as well as the technical aspects of Posterization. Mr. Rockwell's anti-forgery technique relied on CMYK color model paints closely matching the RGB color model to paint his initials, the syllables of his name and the year of completion.

The RGB model is an additive color model wherein various quantities of red, green and blue, from which the model derives its name, are added to black to produce a larger range of colors. The primary purpose of the RGB color model is for the sensing, representation, and display of images in electronic systems like cameras, televisions and computer monitors.

The CMYK model is a subtractive color model wherein various quantities of the four standard colors cyan, magenta, yellow and black are subtracted from white. CMYK derives its name from an acronym for the four standard colors.

The HSV color model (Hue, Saturation, Value) defines a color space by considering Hue. This color space describes colors (hue or tint) by considering their shade (saturation or amount of gray) and their brightness value. Some color pickers use the acronym HSB, which substitutes the term "Brightness" for "Value", but HSV and HSB are the same color model. As an example, the graphics editor Adobe Photoshop™ uses HSB.

The technical differences between the RGB, CMYK and HSV color models developed by the International Commission on Illumination in the 1930's may be exploited to reveal steganographic symbols in images such as paintings, drawings, pictures or photographs. Systems and methods of the disclosure substantially eliminate, or at least partially address, problems in the prior art, enabling authentication of images, for example, with steganographic techniques. Use of disclosed processes prevent the purchase of forgeries. Further, disclosed processes can also be used to verify the authenticity of paintings already held in collections. Disclosed authentication processes reveal steganographic symbols, for example, the hidden initials NR and/or RN in Norman Rockwell paintings after 1942.

Additional aspects, advantages, features and objects of the disclosure will be made apparent from the drawings and the detailed description of the illustrative embodiments construed in conjunction with the appended claims that follow. It will be appreciated that described features are susceptible to being combined in various combinations without departing from the scope of the disclosure as defined by the appended claims.

Referring now to the drawings, particularly by their reference numbers, FIG. 1 is a schematic illustration of an example network environment 1000 that is suitable for practicing embodiments of the disclosure. The network environment 1000 includes one or more data processing units, depicted as a server 400 and an authentication terminal 200 in FIG. 1. The network environment 1000 also includes a database 500 associated with the server 400, and a communication network 100.

The network environment 1000 may be implemented in various ways, depending on various possible scenarios. In one example scenario, the network environment 1000 may be implemented by way of a spatially collocated arrangement of the server 400 and the database 500. In another example scenario, the network environment 1000 may be implemented by way of a spatially distributed arrangement of the server 400 and the database 500 coupled mutually in communication via the communication network 400. In yet another example scenario, the server 400 and the database 500 may be implemented via cloud computing services.

The data processing units are coupled in communication with the server 400 via the communication network 100. The communication network 100 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Examples of the data processing units include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, desktop computers, Network-Attached Storage (NAS) devices, large-sized touch screens with embedded PCs, and interactive entertainment devices, such as game consoles, Television (TV) sets and Set-Top Boxes (STBs).

The network environment 1000 is suitable for supporting implementation of various systems for authenticating an image. For example, server 400 may provide an image authenticating service to data processing units such as authentication terminal 200, while the database 500 stores data pertaining to the one or more digital photographs of one or more images, the authentication of the one or more images or the authentication status of the one or more images.

Optionally, the authentication terminal 200 as well as other data processing units may access the server 400 to download one or more software products associated with authenticating an image. In one embodiment, the systems are arranged in a manner that functionality for authenticating an image is implemented partly in the authentication terminal 200 and partly in the server 400.

In another embodiment, the systems are arranged in a manner such that functionality for authenticating an image is implemented substantially in the authentication terminal 200 by way of downloaded software products. In such a situation, the authentication terminal 200 and other data processing units may be coupled to the server 400 periodically or randomly from time to time, for example, to receive updates from the server 400 and/or to upload status, new digital photographs and/or authentication data to the server 400 for inclusion with database 500. In an example, authentication terminal 200 may download authenticated images for comparison to unauthenticated images or vice versa.

Users associated with the authentication terminal 200 and/or other data processing units such as museums, auction Houses, galleries, and individual art collectors use disclosed services for preparing an image for authentication and/or authenticating an image. In an example, a user selects an image setting, effect or conversion model from a menu that is part of a user interface.

In an embodiment of the disclosure, the authentication terminal 200 and/or the server 400 substantially continuously record and update changes in the status of the one or more digital photographs of one or more images in the database 500, while the analysis and/or authentication of one or more digital photographs of one or more images is being performed with the authentication terminal 200. The authentication terminal 200 is optionally configured to resume the status of the one or more digital photographs of one or more images to their last updated status in the database 500, in case of interruptions in the operable state of services for authenticating an image.

Meanwhile, the authentication service keeps a record of authenticated images. The authenticated images may be recorded and reported to the authentication service automatically. Additionally or alternatively, the authentication service may allow the user to record and report authenticated images. The image authentication service may then be operable to establish authenticity of future instances of a previously authenticated image by comparison with recorded authenticated images.

Accordingly, the server 400 stores data related to the one or more digital photographs of one or more images and/or authentication thereof in the database 500. The data may, for example, include posterized, HSV-converted digital photographs of the authenticated images with annotations highlighting steganographic symbols, and/or associated timestamps. As such, the database 500 may take the form of a database of image authentication data. Not yet authenticated images may be stored in database 500 after one or more processing and/or conversion processes.

Furthermore, the services for authenticating an image can be offered free of cost. Alternatively, the services for authenticating an image can be paid services with a subscription-based billing or a transaction-based billing, such as pay-per-use and pay-per-feature.

FIG. 1 is merely an example, which should not unduly limit the scope of the claims herein. It is to be understood that the specific designation for the network environment 1000 is provided as an example and is not to be construed as limiting the network environment 1000 to specific numbers, types, or arrangements of data processing units, servers, databases and communication networks. A person of ordinary skill in the art will recognize many variations, alternatives, and modifications of embodiments of the disclosure.

FIG. 2 is a schematic illustration of various components of an authentication terminal 200 which is configured to authenticate an image in accordance with embodiments of the disclosure. The authentication terminal 200 includes, but is not limited to, a data memory 210, a computing hardware such as a processor 220, Input/Output (I/O) devices 260, a network interface 240, a configuration of sensors 250, a storage 230, and a system bus 270 that operatively couples various components including the data memory 210, the processor 220, the I/O devices 260, the network interface 240, the sensors 250 and the storage 230. The I/O devices 260 include a display screen for presenting graphical images to a user of the authentication terminal 200.

The authentication terminal 200 also includes a power source for supplying electrical power to the various components of the authentication terminal 200. The power source may, for example, include a rechargeable battery.

The data memory 210 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

The data memory 210 stores applications 214 and an analyzer 218 which may, for example, be parts of a software product associated with an image authentication service provided by server 400 and authentication terminal 200. Executing the software product on the processor 220 results in generating and rendering a graphical user interface on the display screen. The graphical user interface is configured to facilitate user interactions with services for authenticating an image. Data memory 210 may further store an operating system for facilitating execution of various software products on processor 220. Example operating systems include but are not limited to Windows™, OS X™, Linux™ and Chrome™.

In some examples, the display screen may be a touch-sensitive display screen that is operable to receive tactile inputs from the user. These tactile inputs may, for example, include clicking, tapping, pointing, moving, pressing and/or swiping with a finger or a touch-sensitive object like a pen.

Additionally or alternatively, the I/O devices 260 include a mouse or a joystick that is operable to receive inputs corresponding to clicking, pointing, and/or moving a pointer object on the graphical user interface. The I/O devices 260 may also include a keyboard that is operable to receive inputs corresponding to pushing certain buttons on the keyboard.

Additionally, the I/O devices 260 may also include a microphone for receiving an audio input from the user, and a speaker for providing an audio output to the user.

Moreover, the sensors 250 may include one or more of: an accelerometer, a magnetometer, a pressure sensor, a temperature sensor, a gyroscopic sensor, a Global Positioning System (GPS) sensor, or a timer. In some examples, the software product may be interfaced with the sensors 250. When executed on processor 220, the software product is configured to resolve and integrate the outputs of the sensors 250 into useful information about surroundings or location of the user and/or characteristics of images being prepared for authentication or being authenticated.

Moreover, the storage 230 is a computer-readable, non-transient data storage medium and/or memory. In an example, storage 230 may store or otherwise contain one or more digital photographs of one or more images provided for authentication, one or more digital photographs of authenticated images or authentication reports associated with authenticated images.

The software product, when executed on the processor 220, is optionally coupled to the storage 230, and is configured to substantially continuously record and update one or more digital photographs of one or more images in the storage 230. The software product, when executed on the processor 220, is optionally configured to return to its last updated status in the storage 230, in case of interruptions in the operable state of services for authenticating an image.

Additionally, analyzer 218, when executed on the processor 220, may store data related to the one or more digital photographs of one or more images and/or authentication thereof in the storage 230 as any of a variety of file types including but not limited to text or binary such as JPEG. Processor 220 may provide system time as reference for including time-stamps with stored data.

Furthermore, the network interface 240 optionally allows the authentication terminal 200 to upload the data related to the one or more digital photographs of one or more images and/or authentication thereof to the server 400, for example, via the communication network 100. Additionally, the network interface 240 may allow the authentication terminal 200 to access the server 400 to update the software product and/or download one or more new software products associated with the services for authenticating an image.

Moreover, the network interface 240 optionally allows the authentication terminal 200 to communicate with other data processing units, for example, via the communication network 100.

The authentication terminal 200 is optionally implemented by way of at least one of: a mobile phone, a smart telephone, an MID, a tablet computer, a UMPC, a phablet computer, a PDA, a web pad, a PC, a handheld PC, a laptop computer, a desktop computer, an NAS device, a large-sized touch screen with an embedded PC, and an interactive entertainment device, such as a game console, a TV set and an STB.

When executed on the processor 220, the analyzer 218 in combination with applications 214 is configured to convert the digital photograph to a CMYK color model, adjust saturation level of the CMYK color model of the digital photograph, adjust hue of the CMYK model of the digital photograph, convert the saturation-adjusted and hue-adjusted CMYK model of the digital photograph to an HSV color model or color space of the digital photograph, adjust hue of the HSV color model of the digital photograph and posterize the hue-adjusted HSV model of the digital photograph.

In an example, processor 220, upon execution of analyzer 218 in combination with applications 214 is configured to adjust hue of the HSV color model of the digital photograph by adjusting the hue of the cyan components and magenta components of the HSV model of the digital photograph.

In some examples, the analyzer 218, when executed on the processor 220 in combination with applications 214, may be configured to present output to the user on the display screen of the authentication terminal 200. For example, digital images of the one or more digital photographs of one or more images and/or information pertaining to the authentication thereof may be displayed to the user.

In an example, analyzer 218 and/or applications 214 may comprise one or more graphics editing tools. Existing graphics editing tools include Inkscape™, Adobe Illustrator™, GIMP™, IrfanView™ and Adobe Photoshop™.

FIG. 2 is merely an example, which should not unduly limit the scope of the claims herein. It is to be understood that the specific designation for the authentication terminal 200 is provided as an example and is not to be construed as limiting the authentication terminal 200 to specific numbers, types, or arrangements of modules and/or components of the authentication terminal 200. A person of ordinary skill in the art will recognize many variations, alternatives, and modifications of embodiments of the disclosure.

FIGS. 6-12 represent output taking the form of digital photographs of various Norman Rockwell paintings in various states of conversion, in accordance with an embodiment of the disclosure. When executed on the processor 220, analyzer 218 in combination with applications 214 and I/O devices 260 is configured to present digital photographs in initial as well as various conversion states on the graphical user interface generated and rendered on the display of the authentication terminal 200.

FIG. 3 is an illustration of actions of an example computer-implemented process for authenticating an image, in accordance with an embodiment of the disclosure. The process is depicted as a collection of actions in a logical flow diagram, which represents a sequence of actions that may be implemented in hardware, software, or a combination thereof.

At 305, a digital photograph of the image is provided in the RGB color model. In an example, to facilitate the conversion of the image into different color models, the digital photograph is a large format JPEG file or other raster graphics image. FIG. 6A illustrates an example digital photograph taking the form of an authentic painting by Norman Rockwell from November 1954 entitled 'Breaking Home Ties'. FIG. 6B illustrates an example digital photograph taking the form of an imposter painting of 'Breaking Home Ties'. FIG. 7A illustrates an example digital photograph taking the form of a painting by Norman Rockwell from November 1958 entitled 'Elect Casey'. FIG. 8A illustrates an example digital photograph taking the form of a painting by Norman Rockwell from April 1946 entitled 'Playbill'. FIG. 9A illustrates an example digital photograph taking the form of a painting by Norman Rockwell from 1953 entitled 'Girl with Black Eye'. FIG. 10A illustrates an example digital photograph taking the form of a painting by Norman Rockwell from November 1945 entitled 'Mother and Son Peeling Potatoes'. FIG. 11A illustrates an example digital photograph taking the form of a painting by Norman Rockwell from December 1946 entitled 'Boy in Dining Car'. FIG. 12A illustrates an example digital photograph taking the form of a painting by Norman Rockwell from December 1969 entitled Man's 'Tracks on the Moon'.

At 310, the digital photograph is converted to a CMYK color model. Saturation level of the CMYK color model of the digital photograph is then adjusted at 315. In an example, adjusting the saturation of the CMYK color model of the digital photograph may further include adjusting the global saturation of the CMYK color model of the digital photograph. In another example, adjusting the saturation level of the CMYK color model of the digital photograph may further include setting the saturation, on a color wheel ranging from complete desaturation at its center to complete saturation at the end of its radius or at its outer edge, to a point about 60% of the distance between the center of the radius and the outer edge or, in other words, 80% of the distance along the radius from the center of the color wheel to the outer edge. Example color wheels include a red-zeroed color wheel such as that illustrated in FIG. 4. The process may make use of one or more graphics editing tools comprising analyzer 218 and/or applications 214 to convert the image to the CMYK color model and adjust the saturation.

The hue of the CMYK model of the digital photograph is then adjusted at 320. In an example, adjusting the hue of the CMYK color model of the digital photograph may further include adjusting the hue of the cyan components of the CMYK color model of the digital photograph. In another example, adjusting the hue of the cyan components of the CMYK color model of the digital photograph may further include offsetting the cyan components about 57 degrees on a red-zeroed color circle or color wheel (FIG. 4) ranging from pure red at 0 degrees, through pure yellow at about 60 degrees, cyan at about 180 degrees and magenta at about 300 degrees. In an example, the process makes use of one or more graphics editing tools comprising analyzer 218 and/or applications 214 to convert the image to the CMYK color model and adjust the saturation. FIGS. 6C, 6D, 7B, 8B, 9B, 10B, 11B and 12B illustrate example digital photographs, in the form of various Norman Rockwell paintings, converted to a CMYK color model.

At 325, the saturation-adjusted and hue-adjusted CMYK model of the digital photograph is converted to an HSV color model of the digital photograph. The hue of the HSV color model of the digital photograph is then adjusted at 330. In an example, adjusting the hue of the HSV color model of the digital photograph may further include adjusting the hue of the magenta components of the HSV model of the digital photograph. In an example, the process makes use of one or more graphics editing tools comprising analyzer 218 and/or applications 214 to adjust the Hue level to maximize magenta components of the image. For example, color components having a hue measurement input of between about 46 and about 66 degrees are shifted to yield a hue measurement output of between about 281 and about 315 degrees. More particularly, color components having a hue measurement of about 66 degrees are shifted to yield a hue measurement output of about 295 degrees on a red-zeroed color wheel or color circle. Referring to FIGS. 5A & 5B, in a further example, hue adjustments may be made by shifting color components through manipulation of an input/output curve tool of analyzer 218 and/or applications 214.

In some cases, when the quality of the digital photograph is low, adjusting the brightness of the HSV model may facilitate identification of steganographic symbols. When the brightness has been adjusted the saturation of the HSV model may also be adjusted. In an example, adjusting the saturation further comprises adjusting in accordance with an inversely proportional relationship with the brightness adjustment. In an example, the process makes use of one or more graphics editing tools comprising analyzer 218 and/or applications 214 to make any slight adjustments to the Brightness and Saturation levels.

FIGS. 6E, 6F, 7C, 8C, 9C, 10C, 11C & 12C illustrate example digital photographs, in the form of various Norman Rockwell paintings, converted to an HSV color model.

The hue-adjusted HSV model of the digital photograph is then posterized at 335. In an example, the hue-adjusted HSV model of the digital photograph is posterized so as to include three colors. The process makes use of one or more graphics editing tools comprising analyzer 218 and/or applications 214 to posterize the adjusted image. FIGS. 6G, 6H, 7D, 8D, 9D, 10D, 11D & 12D illustrate example digital photographs, in the form of various Norman Rockwell paintings, converted to an HSV color model and posterized.

After the image has been prepared for authentication according to actions 305-335 above, it is determined, at 340, whether the posterized, hue-adjusted HSV model of the digital photograph contains one or more steganographic symbols. For example, it may be determined whether the HSV model of the digital photograph contains the initials/string 'NR', the initials/string 'RN' or both of these. For Norman Rockwell paintings after 1942, the initials/string 'NR' and/or 'RN' appear most often in the colors Cyan, Red or Purple. If the steganographic symbols are not readily apparent, a slight increase in the size of the image may improve their visibility.

There are many images in which steganographic symbols will not be apparent at the three-color level. If it is determined that the HSV model of the digital photograph does not contain one or more steganographic symbols at the three-color level, the posterization of the HSV model of the digital photograph may be adjusted at 345 to include a different number of colors. In an example, the HSV model of the digital photograph is posterized so as to include two colors.

In a further example, if adjusting the posterization of the HSV model of the digital photograph still does not reveal one or more steganographic symbols the posterization level may be adjusted again. When repeated posterization adjustments do not reveal steganographic symbols, adjustment may be discontinued after some pre-established number of iterations.

For authentication of Norman Rockwell paintings, if it is determined that the HSV model of the digital photograph contains one or more steganographic symbols, it is further determined whether the steganographic symbols take the form of the initials/string 'NR' or 'RN'. If it is determined the steganographic symbols take the form of the initials/string 'NR' or 'RN', a notification may be output confirming the authenticity of the image at 355. For example, the user interface of authentication terminal 200 may present a visual message reflecting the confirmed authenticity such as 'The image is authentic!' In another example, the notification may be output as an audible message. In yet another example, the notification may be a number of notifications including a combination of visual and audible messages. FIGS. 6I, 7E, 8E, 9E, 10E, 11E & 12E illustrate example digital photographs, in the form of various Norman Rockwell paintings, converted to a posterized, HSV color model and annotated with example steganographic symbols.

If the initials NR/RN are not identified, the image is not an authentic Norman Rockwell painting. Because the example of FIG. 6B represents a digital photograph of an imposter of the Norman Rockwell painting 'Breaking Home Ties', the example posterized, HSV color model conversion of FIG. 6H does not exhibit any steganographic symbols.

When it is determined no revealed steganographic symbols take the form of the initials/string 'NR' or 'RN', a notification denying the authenticity of the image may be output at 360. For example, the user interface of authentication terminal 200 may present a visual message reflecting the failure to authenticate such as 'Authenticity cannot be confirmed at this time.' In another example, the notification may be output as an audible message. In yet another example, the notification may be a number of notifications including at least one visual message and a least one audible message.

In another example, identification of steganographic symbols such as the initials 'NR' or 'RN', may be performed by a user of disclosed systems and processes. Upon identification of such symbols, the user may manually issue a notification specifying whether authenticity is confirmed. For example, the user may annotate the symbols on the digital photograph, may make other note of their location or may audibly announce or otherwise verbally represent the presence of the symbols. In contrast, upon failure to authenticate, the user may make note of the lack of symbols or may audibly announce or otherwise verbally represent the lack of the symbols and the inability to confirm authenticity.

The actions 305 to 360 are only illustrative and other alternatives can also be provided where one or more actions are added, one or more actions are removed, or one or more actions are provided in a different sequence without departing from the scope of the claims herein.

In an example use of above-described processes, a Norman Rockwell painting completed after 1942 may be authenticated in accordance with the following actions.

A large format digital photograph of an actual Norman Rockwell painting completed after 1942 or of a painting from a book containing oversized images of one or more such paintings is opened using a graphics editing tool. For example, the digital photograph may be at least about 2200 pixels by at least about 2600 pixels or about 5 megapixels. With the digital photograph loaded, within an image menu, mode is selected. Then the CMYK color type of mode is selected. Within the image menu, mode is selected again then the image is converted to RGB profile. Further, the RGB profile is set for blackpoint compression with no dither. Destination is then set to US Web Uncoated v2 with intention set to perceptual and engine set to Adobe (ACE).

The process continues by adjusting the global saturation level to 60 percent of the distance from a center of a color wheel and adjusting the cyan hue to 57 degrees on a color wheel so that cyan components of the image are maximized. At this stage, to save the partially processed image for later use, file type is set as JPEG at a high quality in a progressive format with 5 scans.

With the original image converted to a saturation-adjusted, hue-adjusted, CMYK color type image, a filter is applied to change the color space to HSV. The hue is adjusted until the cyan/magenta hues are maximized to between about 28 degrees and about 58 degrees on a color wheel.

With the CMYK color type image converted to a hue-adjusted, HSV color space type image, a posterize color tool is used to posterize the image at level 3 or such that 3 colors are used. FIGS. 6G, 6H, 7D, 8D, 9D, 10D, 11D & 12D illustrate example digital photographs, in the form of various Norman Rockwell paintings, converted to an HSV color model and posterized. If it is determined that the HSV model of the digital photograph does not contain one or more steganographic symbols at the three-color level, the posterization of the hue adjusted HSV model of the digital photograph may be adjusted at 345 to include a different number of colors. In an example, the hue adjusted HSV model of the digital photograph so as to include two colors.

Embodiments of the disclosure provide a computer program product that includes a non-transitory or non-transient computer-readable storage medium storing computer-executable code for preparing an image for authentication and/or authenticating an image. The code, when executed, is configured to perform one or more of actions 305 to 360 of the process as described in conjunction with FIG. 3. As actions of the disclosed processes may be provided in different sequences, so the computer-executable code may be configured to provide a service having a different sequence of actions from those illustrated in FIG. 3. In one example, the code may be installed to a data processing unit from a non-transient, computer-readable storage medium. In another example, the code may be downloaded from a software application store, for example, from an "App store", to a data processing unit Embodiments of the disclosure are susceptible to being used for various purposes, including, though not limited to enabling users to authenticate images.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A process for authenticating an image, comprising:
   providing a digital photograph of the image;
   converting the digital photograph to a CMYK color model;
   adjusting saturation of the CMYK color model of the digital photograph to 60% of complete saturation;
   adjusting the hue of the CMYK model of the digital photograph to 57 degrees on a red-zeroed color wheel;
   converting the saturation-adjusted and hue-adjusted CMYK model of the digital photograph to an HSV color model of the digital photograph;
   in the HSV color model of the digital photograph shifting input color components having a hue of between about 46 degrees and about 66 degrees on the red-zeroed color wheel to a hue of between about 281 degrees and about 315 degrees on the red-zeroed color wheel;
   posterizing the hue-adjusted HSV model of the digital photograph to include three colors; and
   determining whether the hue-adjusted HSV model of the digital photograph contains one or more steganographic symbols.

2. The process as set forth in claim 1, wherein determining whether the HSV model of the digital photograph contains one or more steganographic symbols further comprises determining whether the HSV model of the digital photograph contains the string 'NR', the string 'RN' or both of these.

3. The process as set forth in claim 1, further comprising posterizing the hue-adjusted HSV model of the digital photograph so as to include two colors when it is determined that the HSV model of the digital photograph does not contain one or more steganographic symbols.

4. The process as set forth in claim 1, wherein adjusting the saturation of the CMYK color model of the digital photograph further comprises adjusting the global saturation of the CMYK color model of the digital photograph.

5. The process as set forth in claim 1, wherein shifting input color components further comprises shifting input color components having a hue of 66 degrees on the red-zeroed color wheel to a hue of 295 on the red-zeroed color wheel.

6. A process for preparing an image for authentication, comprising:
   providing a digital photograph of the image in the RGB color model;
   converting the digital photograph to a CMYK color model;
   adjusting saturation level of the CMYK color model of the digital photograph to 60% of complete saturation;
   adjusting hue of the CMYK model of the digital photograph to 57 degrees on a red-zeroed color wheel;
   converting the saturation-adjusted and hue-adjusted CMYK model of the digital photograph to an HSV color model of the digital photograph;
   in the HSV color model of the digital photograph shifting input color components having a hue of between about 46 degrees and about 66 degrees on the red-zeroed color wheel to a hue of between about 281 degrees and about 315 degrees on the red-zeroed color wheel; and
   posterizing the hue-adjusted HSV model of the digital photograph to include two or three colors.

7. The process as set forth in claim 6, wherein adjusting the saturation level of the CMYK color model of the digital photograph further comprises adjusting global saturation of the CMYK color model of the digital photograph.

8. The process as set forth in claim 6, wherein shifting input color components further comprises shifting input color components having a hue of 66 degrees on the red-zeroed color wheel to a hue of 295 on the red-zeroed color wheel.

9. A process to authenticate Norman Rockwell paintings, comprising:
   providing a large format digital photograph of a painting or a large format digital photograph of a photograph of a painting;
   converting the digital photograph to a CMYK color model;
   adjusting global saturation level to 60% of complete saturation and cyans hue level for the CMYK color model to maximize cyan components by offsetting 57 degrees on a red-zeroed color wheel;
   converting the CMYK color model to HSV color model;
   adjusting hue level of the HSV color model to maximize magenta components by shifting input color components having a hue of between about 46 degrees and about 66 degrees on the red-zeroed color wheel to a hue of between about 281 degrees and about 315 degrees on the red-zeroed color wheel; and
   posterizing the cyan- and magenta-maximized HSV Color Model to include three colors.

10. The process as set forth in claim 9, wherein shifting input color components further comprises shifting input color components having a hue of 66 degrees on the red-zeroed color wheel to a hue of 295 degrees on the red-zeroed color wheel.

11. The process set forth in claim 9, further comprising determining whether initials 'NR' or 'RN' or both appear in the posterized, cyan- and magenta-maximized HSV color model.

* * * * *